(12) United States Patent
Krämer

(10) Patent No.: US 7,080,056 B1
(45) Date of Patent: Jul. 18, 2006

(54) AUTOMATIC PROGRAMMING

(76) Inventor: Gerd Krämer, Richard-Wagner Str. 16, D-69181 Leimen (DE)

( * ) Notice: Subject to any disclaimer, the term of this patent is extended or adjusted under 35 U.S.C. 154(b) by 1303 days.

(21) Appl. No.: 09/704,803

(22) Filed: Nov. 2, 2000

(30) Foreign Application Priority Data

Nov. 2, 1999 (DE) .......................................... 199 52 587

(51) Int. Cl.
*G06N 5/02* (2006.01)

(52) U.S. Cl. .......................... 706/45; 706/13; 711/214; 711/218

(58) Field of Classification Search .................... 706/45, 706/13; 711/214, 218; 712/21; 717/128
See application file for complete search history.

(56) References Cited

U.S. PATENT DOCUMENTS

| | | | | |
|---|---|---|---|---|
| 4,954,951 A | * | 9/1990 | Hyatt | 711/218 |
| 5,083,265 A | * | 1/1992 | Valiant | 712/21 |
| 5,459,846 A | * | 10/1995 | Hyatt | 711/214 |
| 5,841,947 A | * | 11/1998 | Nordin | 706/13 |
| 6,071,317 A | * | 6/2000 | Nagel | 717/128 |

FOREIGN PATENT DOCUMENTS

DE     199 52 587.0-53     6/2001

* cited by examiner

*Primary Examiner*—Wilbert L. Starks, Jr.

(57) ABSTRACT

A method for generating a simple kind of computer based artificial consciousness, which means to give a in a computer running invention-pursuant program the capability to act and to know the effects of its actions and to plan further actions consciously. This is realized by giving the computer the capability to program its processor by its own and to plan that self-programming targeted. This works, because the computer learns to program in machine-code by its own and it has got a dynamical valuation system to weight if its actions are useful or not. Further basic needs like "no_pain" and "no_hunger" are modelled to make it act to fulfill its basic needs. It has also the capability to solve a pregiven by several formulas determined programming aim, which means to develop logical programs which then can be implemented by users into their projects.

21 Claims, 19 Drawing Sheets

3.1 Relational Database of the AC-knowledge:

3.1.1 ER-Diagram of the AC-Database:

3.1.2 Tables of the AC-Database:

Register-Identification-Table: *[RIT: every processor-register gets a Reg.ID and a Reg.BitCode]*

| column: | | datatype | value-range | meaning: |
|---|---|---|---|---|
| Register_ID | (PK) | signed byte | -128..127 | 0 = Flags-reg., 1-... = data-reg., adr.reg., adr.reg.-destinations, FFP-reg., control-reg., debug-reg., etc.; neg.reg.ID = exception-vector-nr. (no processor-reg.) |
| Register_BitCode | | number | $0..2^{128}-1$ | $2^{\wedge}Register\_ID$, 0 if Register_ID is negative. |
| Register_type | | char(1) | 1 Byte | type of register: # = flags-reg., D = data-reg., A = address-reg., V = adr.-reg.-destination, E = exception-vector, etc. (processor dependant). |
| Register_number | | byte | 0..127 | current number of the {register-type}-registers. |
| Register_Description | | varchar2(32) | ≤32 Bytes | optional description of the register[-reference]. |

*Fig. 2a*

| Register_ID | Register_BitCode | Register_type | Register_number | Register_Description |
|---|---|---|---|---|
| ... | 0 | E | ... | {for all Exception-Vectors} |
| -8 | 0 | E | 8 | Privilege-Violation Exception |
| ... | 0 | E | ... | {for all Exception-Vectors} |
| 0 | 1 | # | 0 | Status-Register ($\triangleq$ EFlags$_\pi$) |
| 1 | 2 | D | 0 | Data-Register D0 |
| ... | 4 | D | ... | {for all Data-Registers D1-D6} |
| 8 | 8 | D | 7 | Data-Register D7 |
| 9 | 16 | A | 0 | Address-Register A0 |
| ... | ... | A | ... | {for all Address-Registers A1-A6} |
| 16 | 65536 | A | 7 | Address-Register A7 ( = USP/) |
| 17 | 131072 | V | 0 | Destination of Address-Register A0 |
| ... | ... | V | ... | {for all Adr.-Reg.-Destinations A1-A6} |
| 24 | 16777216 | V | 7 | Destination of Adr.-Reg. A7 [ = (USP)] |
| 25 | 33554432 | v | 0 | Destination before Adr.Reg A0 [-(A0)] |
| | ... | v | ... | {for all Adr.Reg.-Dest. before A1-A6} |
| 32 | $1.0000.0000 | v | 7 | Destination before Adr.Reg A7 [-(USP)] |
| 33 | $2.0000.0000 | F | 0 | Floating-Point Data-Register FPR0 |
| ... | ... | ... | ... | {for all further Registers} |

*Fig. 2b    (RIT in a Motorola-Example)*

Initial-Conditions-Table: *[ICT: every register(-reference) gets 62 initial conditions]*

| column: | | datatype | value-range | meaning: |
|---|---|---|---|---|
| IniConNr | (PK) | signed byte | -31..+30 | number of the initial-condition combination |
| Register_ID | (PK) | signed byte | 0..127 | see RIT |
| Register_Value | | integer | $0..2^{32}-1$ | value of the register(-reference) on actual IniConNr |

*Fig. 3a*

| Therefore 62 * #registers test-values are generated, p.e. using the following function: |
|---|
| Register_Value( IniConNr, Register_ID ) = SGN( IniConNr ) * INT( $2^{\wedge}$ABS(IniConNr/2) + ½ ) + prime_number( 3*Register_ID )     or similar. |
| ,where prime_number(0) = 0 and prime_number(-n) = -prime_number(n) |
| [no 2 equal register(-destination)-values] |

*Fig. 3b*

*Operation-Identification-Table: [OIT: every processor-operation gets an Oper.ID and an Oper.BitCode]*
*column:                    datatype   value range    meaning:*

| Operation_ID (PK) | signed byte | -1..63 | bit of the Operation_BitCode - see table below. |
|---|---|---|---|
| Operation_BitCode (FK) | number | $0..2^{128}-1$ | $2^{\wedge}$Operation_ID - see table below. |
| Operation_Type | char(5) | 5 Bytes | 5 characters-code of the operation-type, see *Fig.4c* |
| Operation_Mnemonic | char(5) | 5 Bytes | abbreviation of the operation - see table below. |
| Operation_Description | varchar2(32) | ≤32 Bytes | optional description of the operation - see table below |

*Fig.4a*

| Operation_ID | Operation_BitCode | Operation_Type | Op.Mnemonic | Operation_Description |
|---|---|---|---|---|
| -1 | 0 | ..... | ??? | unknown operation |
| 0 | 1 | .I11? | TST | set flags in dependence of reg.(-ref.) |
| 1 | 2 | .I12! | NEG | negation\|amount |
| 2 | 4 | .I12! | NOT | bitwise inversion |
| 3 | 8 | :I02_ | MOVI | const.integer→register(-reference) |
| 4 | 16 | :I12+ | ADDI | add constant integer |
| 5 | 32 | :I12- | SUBI | subtract constant integer |
| 6 | 64 | :I13* | MULI | multiply constant integer |
| 7 | 128 | :I23/ | DIVI | divide by constant integer |
| 8 | 256 | :I13% | MODI | rest of integer-division |
| 9 | 512 | :I12* | SHLI | integer-times a duplication |
| 10 | 1.024 | :I12/ | SHRI | integer-times a halvation |
| 11 | 2.048 | :I12\| | ORI | set bits set in a constant integer |
| 12 | 4.096 | :I12& | ANDI | clear bits not set in a const. integer |
| 13 | 8.192 | :I12? | BTSTI | check if int-th bit is set in reg.(-ref.) |
| 14 | 16.384 | :I12? | CMPI | reg.(-ref.)-comparison with integer |
| 15 | 32.768 | II22_ | MOV | move src.-reg.(ref.)→dest.reg(ref.) |
| 16 | 65.536 | II22+ | ADD | addition of register(-reference) |
| 17 | 131.072 | II22- | SUB | subtraction of register(-reference) |
| 18 | 262.144 | II23* | MUL | multiplication of register(-reference) |
| 19 | 524.288 | II33/ | DIV | division by register(-reference) |
| 20 | 1.048.576 | II33% | MOD | rest of division by register(-ref.) |
| 21 | 2.097.152 | II22* | SHL | register(-ref.)-times a duplication |
| 22 | 4.194.304 | II22/ | SHR | register(-ref.)-times a halvation |
| 23 | 8.388.608 | II22\| | OR | set bits set in of register(-reference) |
| 24 | 16.777.216 | II22& | AND | clear bits not set in register(-ref.) |
| 25 | 33.554.432 | II21? | BTST | check if reg.(-ref.)-th bit is set |
| 26 | 67.108.864 | II21? | CMP | compare reg.(-ref.)1 with reg.(-ref.)2 |
| 27 | 134.217.728 | :P00. | JMP | add integer to $PC_U/EIP_\pi$ (=jump to) |
| 28 | 268.435.456 | CP1.< | JLT | jump if CMP < |
| 29 | 536.870.912 | CP1!> | JLE | jump if CMP ≤ |
| 30 | 1.073.741.824 | CP1.= | JEQ | jump if CMP = |
| 31 | 2.147.483.648 | CP1!< | JGE | jump if CMP ≥ |
| 32 | 4.294.967.296 | CP1!= | JNE | jump if CMP ≠ |
| 33 | $2.0000.0000 | CP1.> | JGT | jump if CMP > |
| 34 | $4.0000.0000 | CP1!< | JPL | jump if ≥ 0 |
| 35 | $8.0000.0000 | CP1.< | JMI | jump if < 0 |
| 36 | $10.0000.0000 | CP1.^ | JCS | jump if carry-flag is set |
| 37 | $20.0000.0000 | CP1!^ | JCC | jump if carry-flag is clear |
| 38 | $40.0000.0000 | CP1.~ | JVS | jump if overflow is set |
| 39 | $80.0000.0000 | CP1!~ | JVC | jump if overflow is clear |
| 40 | $100.0000.0000 | CP2.< | DJMP | decrement and jump if reg.(-ref.) < 0 |
| 41 | $200.0000.0000 | PS1.. | CALL | $PC_U/EIP_\pi \rightarrow (USP_U/ESP_\pi)$ ; +JUMP |
| 42 | $400.0000.0000 | SP11. | RET | $(USP_U/ESP_\pi)+ \rightarrow PC_U/EIP_\pi$ |
| 43 | $800.0000.0000 | .I... | I??? | unknown integer-operation |
| 44 | $1000.0000.0000 | .F... | F??? | unknown floating-point-operation |

| 45 | $2000.0000.0000 | FF09 | FINIT | initialise floating-point-unit |
|---|---|---|---|---|
| 46 | $4000.0000.0000 | FI12 | FIST | store float.point-reg.→integer-reg. |
| 47 | $8000.0000.0000 | IF12 | FILD | load integer-reg.→floating-point-reg. |
| 48 | $1.0000*$2^{32}$ | IF22+ | FIADD | floating-point add constant integer |
| 49 | $2.0000*$2^{32}$ | IF22- | FISUB | floating-point subtract const.integer |
| 50 | $4.0000*$2^{32}$ | IF22* | FIMUL | floating-point multiply const.integer |
| 51 | $8.0000*$2^{32}$ | IF22/ | FIDIV | floating-point divide by const.integer |
| 52 | $10.0000*$2^{32}$ | IF21? | FICMP | float.pt.compare with integer→flags |
| 53 | $20.0000*$2^{32}$ | :F02 | FLD# | load constant to floating-point-reg. |
| 54 | $40.0000*$2^{32}$ | .F12! | FABS | build floating-point amount |
| 55 | $80.0000*$2^{32}$ | FF12 | FLD | copy floating-point-register |
| 56 | $100.0000*$2^{32}$ | FF22+ | FADD | add 2 floating-point-register |
| 57 | $200.0000*$2^{32}$ | FF22- | FSUB | subtract 2 floating-point-register |
| 58 | $400.0000*$2^{32}$ | FF22* | FMUL | multiply 2 floating-point-register |
| 59 | $800.0000*$2^{32}$ | FF22/ | FDIV | divide one float.pt.reg. by another |
| 60 | $1000.0000*$2^{32}$ | .F12@ | FSQRT | square-root of a floating-point-reg. |
| 61 | $2000.0000*$2^{32}$ | .F12@ | FSIN | floating-point-sine |
| 62 | $4000.0000*$2^{32}$ | .F12@ | FCOS | floating-point-cosine |
| 63 | $8000.0000*$2^{32}$ | .F12@ | FATAN | floating-point arc-tangent |
| 64 | $1*$2^{48}$ | FF22* | FEXP2 | y:=y*$2^X$ (anykind of exp.-func.) |
| 65 | $2*$2^{48}$ | FF22/ | FLOG2 | y:=x*$\log_2 y$ (any kind of logarithm) |
| 66 | $4*$2^{48}$ | FF21? | FCMP | compare 2 float.-point-reg.→Flags |
| 67 | $8*$2^{48}$ | $I11 | SMOV | move from a special Register |
| 68 | $10*$2^{48}$ | I$11 | MOVS | move to a special Register |
| ... | ... | ... | ... | ... |

*Fig.4b*

... using the following operation-type character-codes:

| 1st char. = source , 2nd char. = dest.: | ? = unknown, ambitious letter for all possible following |
|---|---|
| | . = nothing |
| | : = constant number |
| | I = integer-register-[reference]-value |
| | F = floating-point register |
| | C = condition-code register (last byte in $EFlags_\pi/SR_\mu$) |
| | P = instruction-pointer / program-counter ($EIP_\pi/PC_\mu$) |
| | S = stack-pointer reference-value |
| | ~ = comparison-operation →flags |
| | $ = a special-register like flags-, control-, debug-, ... -reg. |
| | ! = logical NOT for comparison in the 4th field |
| 3rd char. = number of source-registers: | including destination reg., if it's used as source-reg. too |
| 4th char. = number of dest.-registers: | including flags-register but without the instruction-pointer |
| 5th char. = effect of arithmetic: | ? = unknown |
| | . = none |
| | ! = amount\|negation\|bitwise_inversion |
| | + = addition |
| | - = subtraktion |
| | * = multiplication |
| | / = division |
| | % = rest of division |
| | \| = setting of bits (mostly bitwise OR) |
| | & = clearing of bits (mostly bitwise AND) |
| | @ = trigonometric- or exponential-function |
| | > = greater? (CC-flags dependant action) |
| | < = less? (CC-flags dependant action) |
| | = = equal? (CC-flags dependant action) |
| | ^ = carry? (CC-flags dependant action) |
| | ~ = overflow? (CC-flags dependant action) |

*Fig.4c*

*OpCode-Register-Table:* [ORT - by opcode icl, initial-conditions concerned registers and the effect]

| column: | datatype | value-range | meaning: |
|---|---|---|---|
| OpCode (PK) | integer | $0..2^{32}-1$ | complete instruction, truncated if > 4 bytes |
| IniConNr (PK) | signed byte | -31..30 | current number of the used initial conditions |
| Register_ID_dest (PK) | signed byte | 0..127 | one by execution concerned destination-reg. (see RIT) |
| Register_ID_source (PK) | signed byte | -1,0..127 | -1 or one possible source-register (see RIT). |
| value_before_change | integer | $0..2^{32}-1$ | register(-reference)-value before it was changed |
| value_after_change | integer | $0..2^{32}-1$ | register(-reference)-value after changing |
| gradient_if_unsigned | signed byte | -128..127 | before/after-gradient, when defined as unsigned |
| gradient_if_signed | signed byte | -128..127 | before/after-gradient, when defined as signed |
| value_source | integer | $0..2^{32}-1$ | value of a possible source-register(-reference) |
| Operations_BitCode | number | $0..2^{128}-1$ | bitmask, which flags all possible operations between this Register_ID_dest / Register_ID_source -combination (p.e. 2+2=2*2 using same reg.'s). Values see CIT, calculation see fig.19. |

*Fig.5*

For every register- or register-reference-modification of the same opcode-execution one entry is generated, which gives information about the register(-reference)-values before and after the execution and further information about the degree of changing and with it a hint to a possible operation and a possible source-register which were used. (Packed-, nibble-, or BCD-operations are not considered.)
The last address-register is the stack-pointer. The last data-register is the "energy"-register.
An address-register can be every register which value can be a pointer to memory which destination can be accessed using this register as a reference.

Several registers can be modified simultaneous - therefore this additional 1:n table, where *Register_ID_dest* means the identity of the changed register. Sometimes many register(-references) could be the source for one operation - this quantum increases through the sum over all possible operations.
Therefore the following tables identify the used opcode and the concerned register(s):

*OpCode-Learn-Table:* [OLT - ascertained effect of the opcode using the concerning initial conditions]

| column: | datatype | value-range | meaning: |
|---|---|---|---|
| OpCode (PK) | integer | $0..2^{32}-1$ | complete instruction, truncated if > 4 bytes |
| IniConNr (PK) | signed byte | -31..30 | number of used initial condition |
| active_ChkSum_corrupt | boolean | 1\|0 | flag: checksum of active AC-program changed |
| inactive_ChkSum_corrupt | boolean | 1\|0 | flag: checksum of inactive AC-program changed |
| Exception_Vect_changed | signed byte | -128...0 | Register_ID of the (first) overwritten exception-vector |
| multiple_Exc_Vect_chg | boolean | 1\|0 | more than one exception-vector was overwritten |
| Processor_Mode_Changed | boolean | 1\|0 | flag: processor-mode changed (p.e. trace cleared) |
| Number_of_Exception | byte | 0..N+1 | exception-number [0: = no_exception] (if 0=exc.:+1) |
| OpCode_length_or_jump | signed byte | -128..127 | $EIP_\pi/PC_\mu$ after execution − $EIP_\pi/PC_\mu$ before execution -128=\$FF=long back-jump, 127=\$7F=long forward j. |
| CCR_before_execution | byte | 0..255 | CC-flags, which could cause a jump. |
| Register_changed_BitCode | number | $0..2^{128}-1$ | $\Xi 2^{\wedge}$ORT.Register_ID_dest $\forall$ ORT(opcode,IniConNr) |
| Register_source_BitCode | number | $0..2^{128}-1$ | $\Xi 2^{\wedge}$ORT.Register_ID_source $\forall$ ORT(opcode,IniConNr) |
| max_Operations_BitCode | number(19) | $0..2^{128}-1$ | $\Xi$ORT.Calculation_BitCode $\forall$ORT(opcode,IniConNr) |
| min_Operations_BitCode | number(19) | $0..2^{128}-1$ | $\zeta$ORT.Calculation_BitCode $\forall$ORT(opcode,IniConNr) |
| time_of_execution | integer | $0..2^{32}-1$ | deci-seconds after {20.9.1994, 0:00:00,0 o'clock} |
| cycles_of_execution | byte | 1..255 | clock-cycles the opcode-execution needed |
| aim_valuation | signed byte | -128..127 | aim-attaining-valuation using above initial-conditions |
| gradient_aim_valuation | signed byte | -128..127 | -"-difference to *CLT( n-1, IniConNr )*.aim_valuation |

*Fig.6*

*OpCode-Base-Table:* [*OBT - ascertains the effect of the opcode-execution from the initial conditions*]

| column: | datatype | value-range | meaning: |
|---|---|---|---|
| OpCode (PK) | integer | $0..2^{32}-1$ | complete instruction, truncated if > 4 bytes |
| Execution_counter | byte | 0..255 | number of the OLT-entries until now |
| FatalError_counter | byte | 0..255 | number of the opcode-caused fatal errors until now: CheckSum_corrupt, Exception_Vect_changed, Trace_Bit_cheared, Processor_Mode_changed, and the exceptions without *Divide-Error, Overflow*. |
| low_Error_counter | byte | 0..255 | number of *divide*-errors plus *overflow*-exceptions |
| Jump_longOp_probability | signed byte | -128..127 | probability that it's a long opcode or a jump |
| avg_OpCpde_jump_length | signed byte | -128..127 | average length of opcode or jump |
| OpCode_len_unconfirmed | boolean | 1\|0 | min. one divergence from above average exists |
| avg_cycles_of_execution | byte | 1..255 | average by opcode-execution needed clock-cycles |
| exec_cycles_unconfirmed | boolean | 1..0 | min. one divergence from above average exists |
| Register_write_probability | signed byte | -128..127 | probability: opcode writes into a register |
| Register_copy_probability | signed byte | -128..127 | probability: opcode copies register |
| Memory_write_probability | signed byte | -128..127 | probability: opcode writes into memory |
| Memory_copy_probability | signed byte | -128..127 | probability: opcode copies memory |
| Reg_to_Mem_probability | signed byte | -128..127 | probability: opcode copies reg. to adr.reg.-destination |
| Mem_to_Reg_probability | signed byte | -128..127 | probability: opcode copies adr.reg.-destination to reg. |
| Multi_Reg_write_prob | signed byte | -128..127 | probability: opcode writes into more than one register |
| Multi_Mem_write_prob | signed byte | -128..127 | probability: opcode writes to many adr.reg.-destination |
| Multi_Reg_to_Mem_prob | signed byte | -128..127 | prob.: opcode copies ≥2 reg. to ≥2 adr.reg.-destination |
| Multi_Mem_to_Reg_prob | signed byte | -128..127 | prob.: opcode copies ≥2 adr.reg.-destinations to ≥2 reg |
| all_Reg_dest_BitCode | number | $0..2^{128}-1$ | $\supseteq$ OLT.Register_changed_Bitcode $\forall$ OLT(OpCode) |
| cut_Reg_dest_BitCode | number | $0..2^{128}-1$ | $\subseteq$ OLT.Register_changed_Bitcode $\forall$ OLT(OpCode) |
| all_Reg_source_BitCode | number | $0..2^{128}-1$ | $\supseteq$ OLT.Register_source_Bitcode $\forall$ OLT(OpCode) |
| cut_Reg_source_BitCode | number | $0..2^{128}-1$ | $\subseteq$ OLT.Register_source_Bitcode $\forall$ OLT(OpCode) |
| max_Operation_BitCode | number | $0..2^{128}-1$ | $\supseteq$ OLT.max_Operation_BitCode $\forall$ OLT(OpCode) |
| min_Operation_BitCode | number | $0..2^{128}-1$ | $\subseteq$ OLT.min_Operation_BitCode $\forall$ OLT(OpCode) |
| all_Operation_BitCode | number | $0..2^{128}-1$ | $\supseteq$ OLT.min_Operation_BitCode $\forall$ OLT(OpCode) |
| cut_Operation_BitCode | number | $0..2^{128}-1$ | $\subseteq$ OLT.max_Operation_BitCode $\forall$ OLT(OpCode) |
| max_write_value | integer | $0..2^{32}-1$ | maximum of all destination-values |
| min_write_value | integer | $0..2^{32}-1$ | minimum of all destination-values |
| avg_write_value | integer | $0..2^{32}-1$ | average over all destination-values |
| max_write_gradient | integer | $0..2^{32}-1$ | maximum gradient of the changed value |
| min_write_gradient | integer | $0..2^{32}-1$ | minimum gradient of the changed value |
| avg_write_gradient | integer | $0..2^{32}-1$ | average gradient of the changes value |
| evaluated_source_Register | signed byte | -1,0..127 | ascertained source-register-ID (after OBT-evaluation) |
| evaluated_source_NumReg | signed byte | -128, -1, 0..127 | -128 ≜ LOB means source-constant; 0..127 means a further source-register ID; none=-1 (after OBT-eval.) |
| evaluated_dest_Register | signed byte | -1, 0..127 | ascertained destination-register after OBT-evaluation |
| evaluated_dest_Register2 | signed byte | -1, 0..127 | possible 2nd dest.-reg. after OBT-evaluation or flags-reg. (2 real dest.-reg. ⇒ flags-reg. not appreciated). |
| evaluated_Operation_ID | signed byte | -1,0..63 | ascertained operation-ID (after OBT-evaluation) |
| Confirmation_counter | byte | 0..255 | counter: same effects on other initial conditions |
| max_aim_valuation | signed byte | -128..127 | max. valuability of the opcode for aim-attaining |
| avg_aim_valuation | signed byte | -128..127 | average valuability of the opcode for aim-attaining |
| max_grad_aim_valuation | signed byte | -128..127 | max. gradient of aim-attaining in relation to the by 1 shorter opcode-combination of the last CBT(i-1). |
| avg_grad_aim_valuation | signed byte | -128..127 | average gradient concerning above -"- |

*Fig. 7*

*Datatypes:* Boolean 1 Bit, BCD/Nibble 4 Bit, *Byte/char(1)* 8 Bit, *Word/short* 16 Bit, *DWord/Integer* 32 Bit, *QWord/number(19)* 64 Bit, *number/number(38,0)* 128 Bit (38 digits ≜ 16 bytes), *varchar2(N)* string of variable length with max.N characters, *long* very long string with max(longDef) characters.

The following combination-tables are created dynamically - they have the same non-PK-columns, like the OBT respectively OLT respectively ORT, but for every additional number of combinations a further more opcode in the PK:

Combination-Register-Table: [CRT(i), i = number of opcodes in the combination, CRT(1) = ORT]

| column: | datatype | value-range | meaning: |
|---|---|---|---|
| OpCode_1 (PK) | integer | $0-2^{32}-1$ | opcode #1 (first of the combination) |
| {for all OpCodes} (PK) | all integer | $0-2^{32}-1$ | {for all opcodes from #2 up to N-1} |
| OpCode_N (PK) | integer | $0-2^{32}-1$ | opcode#N (last of the combination) |
| IniConNr (PK) | signed byte | -31..30 | current number of the used initial conditions |
| Register_ID_dest (PK) | signed byte | 0..127 | one by execution concerned destination-reg. (see RIT) |
| Register_ID_source (PK) | signed byte | -1..127 | -1 or one possible source-register (see RIT). |
| {same non-PK columns like in the Opcode-Register-Table.} | see above | see above | same non-PK columns like ORT. |

Fig.8

Combinations-Learn-Table: [CLT(i), i = number of opcodes in the combination, CLT(1) = OLT]

| column: | datatype | value-range | meaning: |
|---|---|---|---|
| OpCode_1 (PK) | integer | $0-2^{32}-1$ | opcode #1 (first of the combination) |
| {for all OpCodes} (PK) | all integer | $0-2^{32}-1$ | {for all opcodes from #2 up to N-1} |
| OpCode_N (PK) | integer | $0-2^{32}-1$ | opcode#N (last of the combination) |
| IniConNr (PK) | signed byte | -31..30 | current number of the used initial conditions |
| {same non-PK columns like in the Opcode-Learn-Table.} | see above | see above | same non-PK columns like OLT. |

Fig.9

Combinations-Base-Table: [CBT(i), i = number of opcodes in the combination, CBT(1) = OBT]

| column: | datatype | value-range | meaning: |
|---|---|---|---|
| OpCode_1 (PK) | integer | $0-2^{32}-1$ | opcode #1 (first of the combination) |
| {for all OpCodes} (PK) | all integer | $0-2^{32}-1$ | {for all opcodes from #2 up to N-1} |
| OpCode_N (PK) | integer | $0-2^{32}-1$ | opcode#N (last of the combination) |
| {same non-PK columns like in the Opcode-Base-Table.} | see above | see above | same non-PK columns like OBT. |

Fig.10

CBT(max.) = CPT = Combination-Plan-Table = point of origin of the outcoming program.

Programming-aim and valuation-function tables:

*Aim-Solution-Table:* [AST - solutions of all programming-aims]

| column: | | datatype | value-range | meaning: |
|---|---|---|---|---|
| Aim_ID | (PK) | short | 0..65535 | Identifier of the programming-aim |
| Solution_Nr | (PK) | byte | 0..255 | number of the solution-program |
| aim_Program | | long | String | opcode-combination of the solution here as a string |
| Program_length | | short | 1..65535 | length of the solution-program in doublewords |
| cycles_of_execution | | integer | $1..2^{32}-1$ | execution-time in clock-cycles of the solution-program |
| used_Registers_BitCode | | number | $1..2^{128}-1$ | bitcode of all in the solution-program used registers |
| used_Operations_Bitcode | | number | $1..2^{128}-1$ | bitcode of all in the solution-program used opcodes |
| used_aim_Valuation_Func | | signed short | 0..32767 | identifier of the used aim-distance valuation-function |

*Fig. 11*

*Aim-Description-Table:* [ADT - identification and description of programming-aim]

| column: | | datatype | value-range | meaning: |
|---|---|---|---|---|
| Aim_ID | (PK) | short | 0..65535 | Identifier of the programming-aim |
| aim_Description | | varchar2(32) | ≤32 Bytes | description of the programming-aim |
| used_Processor_Mode | | integer | $0-2^{32}-1$ | flags above CC \| control-register-bits |
| all_dest_Register_BitCode | | number | $1..2^{128}-1$ | bitcode of all output-registers in this task |
| all_source_Register_BitCode | | number | $1..2^{128}-1$ | bitcode of all input-registers in this task |
| unused_Regiser_BitCode | | number | $1..2^{128}-1$ | bitcode of all registers which should not be used |
| unused_Operation_BitCode | | number | $0..2^{128}-1$ | bitcode of all opcode-IDs which are not allowed to use in this task (default = $0000.0000:0000.0000) |
| aim_implement_solutions | | long | String | string of the Aim_ID's (words) of earlier solutions, which could be implemented here. |
| aim_fulfill_valuation_mode | | boolean | 0\|1 | mode of aim-valuation: 0 = SQL ; 1 = machine-code |
| aim_fulfilled_Flag_Function | | varchar2(99) | ≤99 Bytes | boolean aim-attained recognition-function as a string |
| aim_Valuation_FunctionID | | signed short | 0..32767 | identifier of the valuation-function (see VFT) |

*Fig. 12*

*Functions-Identification-Table:* [FIT - table of the basic subfunctions used in the valuation-function]
a.) for SQL-functions:

| column: | datatype | value-range | meaning: |
|---|---|---|---|
| Function_ID (PK) | signed byte | -1..127 | identification-number of the basic function |
| Function_BitCode | number(19) | $0..2^{64}-1$ | bitcode of this basic function (only one bit is set) |
| Function_Name | char(5) | 5 Bytes | function-name |
| Function_Type | byte | 0..99 | 0 = value, 1 = unitary, 2 = binary, 3 = ternary, ... |
| Function_Flatten | signed byte | -127..127 | degree of flattening [ + = steepening, − = flattening] |
| Function_Template | varchar2(99) | ≤99 Bytes | SQL function-template |
| Function_Description | varchar2(99) | ≤99 Bytes | optional description of the basic sub-function |

*Fig. 13a*

| F.ID | Function_BitCode | F.Name | F.T. | F.F. | Function_Template | Function_Description |
|---|---|---|---|---|---|---|
| 0 | 1 | NUM | 0 | 0 | < following_value > | a constant number follows |
| 1 | 2 | ENGY | 0 | 0 | ELT.energy_after | energy after execution |
| 2 | 4 | GRAD | 0 | 0 | ELT.energy_after −ELT.energy_before | energy-gradient |
| 3 | 8 | VALUE | 0 | 0 | CLT(n).< columnNr > | value in the following column-number (last row) |
| 4 | 16 | EREG | 0 | 0 | < EnergyRegister_ID > | ID of the energy-register |
| 5 | 32 | SGN | 1 | 0 | SIGN( %s ) | algebraic sign |
| 6 | 64 | ROUND | 1 | 0 | ROUND( %s, 0 ) | rounded |
| 7 | 128 | INT | 1 | 0 | FLOOR( %s ) | truncated after dec.point |
| 8 | 256 | ABS | 1 | 0 | ABS( %s ) | amount |
| 9 | 512 | NEG | 1 | 0 | −( %s ) | negation |
| 10 | 1.024 | ADD | 2 | 1 | ( (%s)+(%s) ) | addition |
| 11 | 2.048 | SUB | 2 | −1 | ( (%s) − (%s) ) | subtraction |
| 12 | 4.096 | MUL | 2 | 4 | ( (%s) * (%s) ) | multiplication |
| 13 | 8.192 | DIV | 2 | −4 | ( (%s) / (%s) ) | division |
| 14 | 16.384 | MOD | 2 | −2 | MOD( %s, %s ) | rest of division |
| 15 | 32.767 | SQRT | 1 | −8 | SQRT( %s ) | square-root |
| 16 | $1.0000 | CBRT | 1 | −12 | POWER( %s, 1/3 ) | cube-root |
| 17 | $2.0000 | MIN | 2 | −10 | LEAST( %s, %s ) | minimum |
| 18 | $4.0000 | MAX | 2 | −10 | GREATEST( %s, %s ) | maximum |
| 19 | $8.0000 | LN | 1 | −48 | LN( %s ) | natural logarithm |
| 20 | $10.0000 | EXP | 1 | 48 | EXP( %s ) | nat. exponential-function |
| 21 | $20.0000 | LD | 1 | −32 | LOG( 2, %s ) | logarithm on base 2 |
| 22 | $40.0000 | POT2 | 1 | 32 | POWER( 2, %s ) | 2nd power of ... |
| 23 | $80.0000 | SIN | 1 | −64 | SIN( %s ) | sine |
| 24 | $100.0000 | COS | 1 | −64 | COS( %s ) | cosine |
| 25 | $200.0000 | TAN | 1 | 127 | TAN( %s ) | tangent |
| 26 | $400.0000 | ASIN | 1 | 127 | ASIN( %s ) | arc sine |
| 27 | $800.0000 | ACOS | 1 | 127 | ACOS( %s ) | arc cosine |
| 28 | $1000.0000 | ATAN | 1 | −127 | ATAN( %s ) | arc tangent |
| 29 | $2000.0000 | SINH | 1 | 40 | SINH( %s ) | sine hyperbolic |
| 30 | $4000.0000 | COSH | 1 | 50 | COSH( %s ) | cosine hyperbolic |
| 31 | $8000.0000 | TANH | 1 | −127 | TANH( %s ) | tangent hyperbolic |
| 32 | $1.0000.0000 | LOG | 2 | −64 | LOG( %s, %s ) | logarithm |
| 33 | $2.0000.0000 | POT | 2 | 64 | POWER( %s, %s ) | n-th power of ... |
| 34 | $4.0000.0000 | OR | 2 | 1 | ( (%s) \| (%s) ) | bitwise OR |
| 35 | $8.0000.0000 | AND | 2 | −1 | ( (%s) & (%s) ) | bitwise AND |
| 36 | $10.0000.0000 | EQ | 2 | −127 | DECODE( %s, %s, 1, 0 ) | equal |
| 37 | $20.0000.0000 | LE | 2 | −127 | DECODE( GREATEST( %s − %s, 0 ), 0, 1, 0 ) | less-equal |
| 38 | $40.0000.0000 | GE | 2 | −127 | DECODE( LEAST( %s −%s, 0 ), 0, 1, 0 ) | greater-equal |
| 39 | $80.0000.0000 | FRAME | 1 | −10 | GREATEST( LEAST( %s, +127 ), −128 ) | frame to signed-byte: max. = 127, min. = −128 |
| 40 | $100.0000.0000 | BITS | 1 | −64 | (1 & %s) +(2 & %s)/2 +(4 & %s)/4 +(8 & %s)/8 +.... | number of bits in the integer value |
| 41 | $200.0000.0000 | S_REG | 0 | 0 | ADT.all_source_Registers- BitCode | bitcode of the source-register |
| 42 | $400.0000.0000 | D_REG | 0 | 0 | ADT.all_dest_Registers_BitCode | bitcode of dest.-register |
| 43 | $800.0000.0000 | AIM_F | 0 | 0 | VAL( ADT.aim_fulfilled_Flag_ Function ) | result of the boolean aim-fulfilled-function |
| ... | ... | ... | .. | ... | ... | ... |

Fig. 13b

*b.) for machine-code functions:*

| column: | datatype | value-range | meaning: |
|---|---|---|---|
| Function_ID (PK) | signed byte | -1..127 | identification-number of the basic function |
| Function_BitCode | number(19) | $0..2^{64}-1$ | bitcode of this sub-function |
| Operations_BitCode | number | $0..2^{128}-1$ | bitcode of the used opcodes in this function |
| Registers_BitCode | number | $0..2^{128}-1$ | bitcode of the used registers in this function |
| Function_Name | char(5) | 5 Bytes | short notation of this sub-function |
| Function_Type | byte | 0..99 | 0 = value, 1 = unitary, 2 = binary, 3 = ternary, ... |
| Function_Flatten | signed byte | -128..127 | degree of function-flattening (1 $\triangleq$ f(x) = x) |
| Function_OpCodes | number | $1..2^{128}-1$ | sub-function in machine-code |
| Function_Description | varchar2(99) | ≤99 Bytes | optional description of the sub-function |

*Fig. 14a*

| Func.ID | Func.BitCode | Oper.BitCode | Reg.BitCode | Func.Name | F.T. | Func.OpCodes | Function_Descript. |
|---|---|---|---|---|---|---|---|
| 0 | 1 | $A000.4008 | ⟨energy⟩ | FRAME | 1 | s.b. Func.1 | prevent overflow |
| 1 | 2 | $28800.0009 | ⟨energy⟩ | SGN | 1 | s.b. Func.2 | signum |
| 2 | 4 | $0000.0002 | ⟨energy⟩ | NEG | 1 | ⟨NEG⟩ | negation |
| 3 | 8 | $0000.0200 | ⟨energy⟩ | MUL2 | 1 | ⟨SHLI⟩ | division by 2 |
| 4 | 16 | $0000.0400 | ⟨energy⟩ | DIV2 | 1 | ⟨SHRI⟩ | multiplication by 2 |
| 5 | 32 | $0000.0100: 4A00.8018 | ⟨DO⟩|⟨en⟩ | ILOG2 | 1 | s.b. Func.3 | mogarithm dualis |
| 6 | 64 | $1000.C000: 0000.0000 | ⟨FPO⟩|⟨en⟩ | ISQRT | 1 | s.b. Func.4 | square-root |
| 7 | 128 |  | s. 1.4.2 | ICBRT | 1 | s.above 1.4.2 | cube-root |
| 8 | 256 | $0000.8000 | ⟨en-1⟩|⟨en⟩ | MOV | 2 | ⟨MOV⟩ | copying of one reg. before energy-reg. |
| 9 | 512 | $0000.8000 | ⟨en-1⟩|⟨en⟩ | SWAP | 2 | s.b. Func.5 | swap with reg. before energy-reg. |
| 10 | 1024 | $0001.0000 | ⟨en-1⟩|⟨en⟩ | ADD | 2 | ⟨ADD⟩ | addition with -"- |
| 11 | 2048 | $0002.0000 | ⟨en-1⟩|⟨en⟩ | SUB | 2 | ⟨SUB⟩ | subtraction of -"- |
| 12 | 4096 | $0004.0000 | ⟨en-1⟩|⟨en⟩ | MUL | 2 | ⟨MUL⟩ | multiplied with -"- |
| 13 | 8192 | $0008.0000 | ⟨en-1⟩|⟨en⟩ | DIV | 2 | ⟨DIV⟩ | division by -"- |
| ... | ... | ... | ... | ... | .. | ... | ... |

*Fig. 14b*

| Function: | OpCodes of: (machine-code compilation of these mnemonics, here a Motorola-Example) |
|---|---|
| Func.1 | CMPI 127,⟨E⟩ ; JLE ⟨+2⟩ ; MOVI #127,⟨E⟩ ; CMPI -128,⟨E⟩ ; JGE ⟨+2⟩ ; MOVI #-128,⟨E⟩ |
| Func.2 | TST ⟨E⟩ ; JGE ⟨+3⟩ ; MOVI #-1,⟨E⟩ ; JMP ⟨+5⟩ ; JGT ⟨+3⟩ ; MOVI #0,⟨E⟩ ; JMP ⟨+2⟩ ; MOVI #+1,⟨E⟩ |
| Func.3 | MOVI #31,D0 ; BTST D0,⟨E⟩ ; JEQ ⟨+3⟩ ; DJMP D0,⟨-2⟩ ; ADDI #1,D0 ; MOVE D0,⟨E⟩ |
| Func.4 | FILD ⟨E⟩ ; FSQRT ; FIST ⟨E⟩ |
| Func.5 | MOVE ⟨E-1⟩,-(A7) ; MOVE ⟨E⟩,⟨E-1⟩ ; MOVE (A7)+,⟨E⟩ |

*Fig. 14c*

*Valuation-Function-Table:* [VFT - Table of the valuation-functions]

| column: | datatype | value-range | meaning: |
|---|---|---|---|
| Valuation_Function_ID *(PK)* | signed short | ±32767 | identifier of the valuation-function (energyspecif. neg.) |
| Valuation_Function_Type | char(1) | 'E'\|'A' | 'E' = energy-valuation, 'A' = valuation for reaching closeness to programming-aim, ... (maybe further) |
| Valuation_Function_Mode | boolean | 0\|1 | 0 = SQL-mode ; 1 = machine-code mode |
| Valuation_Function | varchar2(99) | ≤99 Bytes | valuation-function for energy- or aim-attainment |
| execution_counter | integer | $0-2^{32}-1$ | number of uses of this valuation-function |
| used_Functions_BitCode | number(19) | $0..2^{64}-1$ | BitCodes of all subfunctions |
| Function_ID_Chain | varchar2(99) | ≤99 Bytes | chain of subfunctions (one byte ≙ one Function_ID) |
| avg_Func_execution_time | integer | $0-2^{32}-1$ | average by val.-func.-execution needed clock-cycles |
| boundary_value_counter | integer | $0-2^{32}-1$ | counter incremented if the result is -128 or +127 |
| low_value_counter | integer | $0-2^{32}-1$ | counter incremented if the result inside ±16 |
| Valuation_Function_value | signed byte | -128..127 | valuability of the valuation-function = SAC.*Self-Valuation_Aim/Energy( Valuation_Function, Values )* |

*Fig. 15a*  Initial Entries for Energy-Valuation and Aim-Closeness-Valuation:

| ID | Ty | M | Valuation_Function |
|---|---|---|---|
| -1 | 'E' | 0 | MAX[ MIN[ SGN( *EnergyReg'−EnergyReg°* ) · SQRT( *EnergyReg'−EnergyReg°* ) −32· Π CLT(i).*Register_changed_BitCode* &( ! 2^*Energy_Register_ID* ) } , +127], -128] |
| 0 | 'A' | 0 | MAX[ MIN[ 16· Π CLT(i).*Register_changed_BitCode* & ADT.*all_dest_Register_BitCode* } +16· Π CLT(i).*Register_source_BitCode* & ADT.*all_source_Register_BitCode* } +32·ADT.*aim_fulfilled_Flag_Function*( *Aim_ID* ) −CLT(i).*Processor_Mode_changed* − ¼ ·CLT(i).*cycles_of_execution* −( CLT(i).*active\|inactive_ChkSum_corrupt* ) −( CLT(i).*Exception_vect_changed* > 0 ) −( CLT(i).*Number_of_Exception* > 0 ) − ½ ( CLT(i).*OpCode_length_or_jump* > 4 or ≤ 0 ), +127], -128] |

| ex# | used_F._BitCode | Function_ID_chain | ex.T | bdy# | low# | F.Val |
|---|---|---|---|---|---|---|
| 0 | $189.0040.983B | 2,5; 2,15; 12; 4,22,3,11,35,40,1,32,12; 11 ; 39 | 0 | 0 | 0 | 0 |
| 0 | $EE9.0001.3AAA | 3,11,42,35,1,16,12; 3,12,41,35,1,16,12,10; 43,1,32,10, 3,7,11; 3,16,1,5,13,11; 3,3,11; 3,5,11 3,5,5,10; 3,8,5,10; 3,9,1,0,37,11;3,9,1,5,38,11;39 | 0 | 0 | 0 | 0 |

*Fig. 15b*

*Status of the Artificial Consciousness:* [SAC - status-values of the AC-program (only 1 row)]

| column: | datatype | value-range | meaning: |
|---|---|---|---|
| Programm_StartDate | timestamp | datime | date and time of the start of the AC-program |
| actual_Processor_Mode | integer | $0-2^{32}-1$ | flags above CCR \| control-register-bits |
| actual_CPT_index | byte | 1..255 | CBT( max(i) = *actual_CPT_Nr* ) = actual CPT |
| CxT_counter | short | 1..65535 | number of creatings of the dynamic CxT-tables |
| Aims_total | short | 1..65535 | number of total programming-aims |
| Aims_soluted | short | 0..65535 | number of solved programming-aims |
| actual_Aim_ID | short | 0..65535 | ID of the actual programming-aim |
| Aim_Valuation_Mode | boolean | 0\|1 | mode of the programming-aim-specific valuation-function: 0 = SQL-mode ; 1 = machine-code mode |
| Aim_Valuation_FunctionID | signed short | 0..32767 | actual VFT.*Valuation_Function_ID* referring the closeness to the programming-aim |
| Aim_Self_Valuation_Func | varchar2 (400) | max.400 Chars. | PL/SQL-valuation-function referring the efficiency of the valuation-function |
| Energy_Valuation_Mode | boolean | 0\|1 | mode of the energyspecific valuation-function 0 = SQL-mode ; 1 = machine-code mode |
| Energy_Valuation_Func_ID | signed short | -1..-32768 | actual VFT.*Valuation_Function_ID* for energy-valuation |
| Energy_Self_Valuation_Func | varchar2 (400) | max.400 Chars. | PL/SQL-valuation-function referring the efficiency of the energyspecific valuation-function |
| max_Valuation_Function | signed short | 0..32767 | highest ID of all valuation-functions in the VFT. |
| min_Valuation_Function | signed short | -1..-32768 | lowest ID of all valuation-functions in the VFT. |

*Fig. 16*

*Energy-Learn-Table:* [ELT - appraises energyspecific actions in dependence of the used initial-conditions]

| column: | datatype | value-range | meaning: |
|---|---|---|---|
| Energy_action (PK) | number | $0..2^{128}-1$ | max.16 byte opcode-combination of the action which changed the energy-register. |
| IniConNr (PK) | signed byte | -31..30 | number of the used initial condition |
| Energy_before | integer | $0..2^{32}-1$ | energy-register before execution |
| Energy_after | integer | $0..2^{32}-1$ | energy-register after execution |
| min_Operations_BitCode | number | $0..2^{128}-1$ | bitcode of the probably used opcodes. |
| max_Operations_BitCode | number | $0..2^{128}-1$ | bitcode of the possibly used opcodes. |
| Register_changed_BitCode | number | $1..2^{128}-1$ | bitcode of the by action changed registers. |
| Register_source_BitCode | number | $1..2^{128}-1$ | bitcode of the probable source-registers. |
| used_cycles_of_execution | short | 1..65535 | needed clock cycles for the energyspecific action |
| Energy_valuation | signed byte | -128..127 | result of the actual *VFT.Energy_valuation_Function* |
| Valuation_Function_ID | signed short | -1..-32768 | used energyspecific valuation-function |

*Fig. 17*

*Energy-Base-Table:* [EBT - evaluation of the energyspecific actions]

| column: | datatype | value-range | meaning: |
|---|---|---|---|
| Energy_action (PK) | number | $0..2^{128}-1$ | max.16 byte opcode-combination of the action which changed the energy-register. |
| Execution_counter | byte | 0..255 | number of the ELT-entries until now. |
| FatalError_counter | byte | 0..255 | number of the occurred fatal errors: fatal errors correlate the columns 3-7 of the above learn-table, except *Divide-Error* or *Overflow-Exc*. |
| low_Error_counter | byte | 0..255 | number of *Divide-Errors* or *Overflow* -Exceptions |
| avg_Energy_after | integer | $0..2^{32}-1$ | average energy-value after the action |
| all_Reg_dest_BitCode | number | $0..2^{128}-1$ | $\exists$ ELT.Register_changed_Bitcode $\forall$ ELT(OpCode) |
| cut_Reg_dest_BitCode | number | $0..2^{128}-1$ | $\subset$ ELT.Register_changed_Bitcode $\forall$ ELT(OpCode) |
| all_Reg_source_BitCode | number | $0..2^{128}-1$ | $\exists$ ELT.Register_source_Bitcode $\forall$ ELT(OpCode) |
| cut_Reg_source_BitCode | number | $0..2^{128}-1$ | $\subset$ ELT.Register_source_Bitcode $\forall$ ELT(OpCode) |
| max_Operation_BitCode | number | $0..2^{128}-1$ | $\exists$ ELT.max_Operation_BitCode $\forall$ ELT(OpCode) |
| min_Operation_BitCode | number | $0..2^{128}-1$ | $\subset$ ELT.min_Operation_BitCode $\forall$ ELT(OpCode) |
| all_Operation_BitCode | number | $0..2^{128}-1$ | $\exists$ ELT.min_Operation_BitCode $\forall$ ELT(OpCode) |
| cut_Operation_BitCode | number | $0..2^{128}-1$ | $\subset$ ELT.max_Operation_BitCode $\forall$ ELT(OpCode) |
| max_write_value | integer | $0..2^{32}-1$ | maximum of all energy-values after energy-action |
| min_write_value | integer | $0..2^{32}-1$ | minimum of all energy-values after energy-action |
| avg_write_value | integer | $0..2^{32}-1$ | average of all energy-values after energy-action |
| max_write_gradient | integer | $0..2^{32}-1$ | maximum gradient of the changes energy-register |
| min_write_gradient | integer | $0..2^{32}-1$ | minimum gradient of the changes energy-register ## |
| avg_write_gradient | integer | $0..2^{32}-1$ | average gradient of the changes energy-register |
| equal_value_probability | signed byte | -128..127 | probability of equal result of energyspecific action |
| avg_Energy_gradient | signed int | $\pm 2^{31}$ | average value-gradient of this energyspecific action |
| equal_Gradient_probability | signed byte | -128..127 | probability: gradient is constant |
| avg_cycles_of_execution | short | 1..65535 | average needed clock cycles for this action |
| avg_Energy_valuation | signed byte | -128..127 | result of the actual *VFT.Energy_valuation_Function* |
| Valuation_Function_ID | signed short | -1..-32768 | ID of the used energy-valuation-function |

*Fig. 18*

3.2 Flowchart of the AC-Program:

*3.2.1 CxT(i) value assignments:*

ORT & CRT(i) value assingments:

| |
|---|
| ORT.Register_ID_dest := $\log_2$( Bit(OLT.Register_changed_Mask), *of the regarded changing* ) |
| ORT.Register_ID_source := Register_ID( $C°$ ), if ORT.calculation_code > 0, *otherwise* -1 |
| ORT.value_before_change := value(Register_ID_dest), *before opcode-execution* |
| ORT.value_after_change := value(Register_ID_dest), *after opcode-execution* |
| ORT.gradient_if_signed := MAX[ MIN[ ORT.value_after_change - ORT.value_before_change, +127], -128] |
| ORT.gradient_if_unsigned := MAX[ MIN[ ORT.value_after_change - ORT.value_before_change, +127], -128] |
| ORT.Operation_BitCode := $1 \cdot$(Flags'$\neq$Flags°)&&$\forall$(V'=V°)&&[ NF&&($V_i° < 0$) \|\| ZF&&($V_i° = 0$) ] <br> $+ 2 \cdot [(V_i' = -V_i°)$&&$\forall$(V'=V°)] $+ 4 \cdot [(V_i' = \sim V_i°)$&&$\forall$(V'=V°)] $+ 8 \cdot [(V_i' = $ OLB)&&$\forall$(V'=V°)] <br> $+ 16 \cdot [(V_i' = V_i° +$OLB)&&$\forall$(V'=V°)] $+ 32 \cdot [(V_i' = V_i° -$OLB )&&$\forall$(V'=V°)] $+ 64 \cdot [(V_i' = V_i° \cdot$OLB)&&$\forall$(V'=V°)] <br> $+ 128 \cdot [(V_i' = V_i°/$OLB)&&$\forall$(V'=V°)] $+ 256 \cdot [(V_i' = V_i°$%OLB)&&$\forall$(V'=V°)] $+ 512 \cdot [(V_i' = V_i° \cdot 2\wedge$OLB)&&$\forall$(V'=V°)] <br> $+ 2^{10} \cdot [(V_i' = V_i°/2\wedge$OLB)&&$\forall$(V'=V°)] $+ 2^{11} \cdot [(V_i' = V_i° |$OLB)&&$\forall$(V'=V°)] $+ 2^{12} \cdot [(V_i' = V_i°$&OLB)&&$\forall$(V'=V°)] <br> $+ 2^{13} \cdot$(Flags'$\neq$Flags°)&&$\forall$(V'=V°)&&[ (ZF=1)&&(2$\wedge$OLB\|$\sim$V°) \| \|(ZF=0)&&!(2$\wedge$OLB\|$V_i°$) ] <br> $+ 2^{14} \cdot$(Flags'$\neq$Flags°)&&$\forall$(V'=V°)&&[ NF&&($V_i°<$OLB)\|\|ZF&&($V_i°=$OLB)] $+ 2^{15} \cdot [(V_i' = C_i°)$&&$\forall$(V'=V°)] <br> $+ 2^{16} \cdot [(V_i' = V_i° + C_i°)$&&$\forall$(V'=V°)] $+ 2^{17} \cdot [(V_i' = V_i° - C_i°)$&&$\forall$(V'=V°)] $+ 2^{18} \cdot [(V_i' = V_i° \cdot C_i°)$&&$\forall$(V'=V°)] <br> $+ 2^{19} \cdot [(V_i' = V_i°/C_i°)$&&$\forall$(V'=V°)] $+ 2^{20} \cdot [(V_i' = V_i°$%$C°)$&&$\forall$(V'=V°)] $+ 2^{21} \cdot [(V_i' = 2^{C°} \cdot V_i°)$&&$\forall$(V'=V°)] <br> $+ 2^{22} \cdot [(V_i' = V_i°/2^{C°})$&&$\forall$(V'=V°)] $+ 2^{23} \cdot [(V_i' = V_i° |C_i°)$&&$\forall$(V'=V°)] $+ 2^{24} \cdot [(V_i' = V_i°$&$C_i°)$&&$\forall$(V'=V°)] <br> $+ 2^{25} \cdot$(Flags'$\neq$Flags°)&&$\forall$(V'=V°)&&[ (ZF=1)&&(2$\wedge C_i°|\sim V_i°$) \| \|(ZF=0)&&!(2$\wedge C_i° | V_i°$) ] <br> $+ 2^{26} \cdot$(Flags'$\neq$Flags°)&&$\forall$(V'=V°)&&[ NF&&($V_i° < C_i°$)\|\|ZF&&($V_i°=C_i°$) ] <br> $+ 2^{27} \cdot [($(IP' $\leq$ IP°)\|\|(IP' > IP°+4)]&&(Flags' = Flags°)&&$\forall$(V'=V°) <br> $+ 2^{28} \cdot [($(IP' $\leq$ IP°)\|\|(IP' > IP°+4)]&&(Flags' = Flags°)&&$\forall$(V'=V°)&&(NF&!VF\|!NF&VF) $+ ... \forall$Jcc(CCR) <br> $+ 2^{40} \cdot \{[($(IP' $\leq$ IP°)\|\|(IP' > IP°+4)]&&($V_i' = V_i° - 1$)\|\|($V_i' = -1$)}&&(Flags' = Flags°)&&$\forall$(V'=V°) <br> $+ 2^{41} \cdot [($ IP' = IP° $\pm$ OLB )&&( (SP) = IP° )&&(Flags' = Flags°)&&$\forall$(V'=V°) <br> $+ 2^{42} \cdot [($ IP' = -4(SP) )&&(Flags' = Flags°)&&$\forall$(V'=V°) $+ 2^{43} \cdot [(V_i' \neq V_i°)$&&(! other_Integer_Operation_BitCode)] <br> $+ 2^{44} \cdot [(V_F' \neq V_F°)$&&(! other_FloatingPoint_Operation_BitCode)] $+ 2^{45} \cdot [($(CCR-Flags' = 0)&&$\forall$($V_F'$ = 0)] $\cdot$ <br> $+ 2^{46} \cdot [(V_i' = C_F°)$&&$\forall$(V'=V°)] $+ 2^{47} \cdot [(V_F' = C_i°)$&&$\forall$(V'=V°)] $+ 2^{48} \cdot [(V_F' = V_F° + C_i°)$&&$\forall$(V'=V°)] <br> $+ 2^{49} \cdot [(V_F' = V_F° - C_i°)$&&$\forall$(V'=V°)] $+ 2^{50} \cdot [(V_F' = V_F° \cdot C_i°)$&&$\forall$(V'=V°)] $+ 2^{51} \cdot [(V_F' = V_F°/C_i°)$&&$\forall$(V'=V°)] <br> $+ 2^{52} \cdot$(Flags'$\neq$Flags°)&&$\forall$(V'=V°)&&[ NF&&($V_F° < C_i°$)\|\|ZF&&($V_F° = C_i°$)] <br> $+ 2^{53} \cdot [$ ($V_F' = 1.0$)\|\|($V_F' = 0.0$)\|\|($V_F' = \pi$)\|\|($V_F' = e$) ]&&$\forall$(V'=V°) <br> $+ 2^{54} \cdot [(V_F' = -V_F°)$&&($V_F° < 0$)&&$\forall$(V'=V°)] $+ 2^{55} \cdot [(V_F' = C_F°)$&&$\forall$(V'=V°)] <br> $+ 2^{56} \cdot [(V_F' = V_F° + C_F°)$&&$\forall$(V'=V°)] $+ 2^{57} \cdot [(V_F' = V_F° - C_F°)$&&$\forall$(V'=V°)] <br> $+ 2^{58} \cdot [(V_F' = V_F° \cdot C_F°)$&&$\forall$(V'=V°)] $+ 2^{59} \cdot [(V_F' = V_F°/V_F°)$&&$\forall$(V'=V°)] $+ 2^{60} \cdot [(V_F' \cdot V_F' = V_F°)$&&$\forall$(V'=V°)] <br> $+ 2^{61} \cdot [V_F' = \sin(V_F°)]$&&$\forall$(V'=V°) $+ 2^{62} \cdot [V_F' = \cos(V_F°)]$&&$\forall$(V'=V°) $+ 2^{63} \cdot [(V_F' = \text{atan}(V_F°))$&&$\forall$(V'=V°)] <br> $+ 2^{64} \cdot [(V_F' = V_F° \cdot 2\wedge V_{F-1}°)$&&$\forall$(V'=V°)] $+ 2^{65} \cdot [(V_F' = V_{F-1} \cdot \log_2(V_F°))$&&$\forall$(V'=V°)] <br> $+ 2^{66} \cdot$(Flags'$\neq$Flags°)&&$\forall$(V'=V°)&&[ NF&&($V_F° < C_F°$)\|\|ZF&&($V_F° = C_F°$)] $+ 2^{67} \cdot [(V_i' = C_s°)$&&$\forall$(V'=V°)] <br> $+ 2^{68} \cdot [(V_s' = C_i°)$&&$\forall$(V'=V°)] $+ ...$ , where V'=value_after_change ($\neg$Flags), V°=value_before_change <br> C°=value(Register_ID_source). Here has to be checked over all Register_ID_source(eq.kind). <br> Though equal Register-ID's in the PK several bits can be set. [p.e. because <br> $4 = 2 + 2 = 2 * 2 = $ SHL(2) = ...] |

*Fig. 19*

OLT & CLT(i) value assignments:

| |
|---|
| OLT.Processor_Mode_Changed := $\Upsilon$ { EFlags$_{71}$/SR$_u$ & ! $\Xi$ 2$\wedge$CCR_Flags } > 0 \|\| <br> ORT.value_after_change( Register_ID *of a special-register* ) |
| OLT.aim_valuation := VFT.Aim_Valuation_Function( SAC.Aim_Valuation_FunctionID, ORT.xxxxx, <br> Registers_changed_BitCode, Registers_source_BitCode, min_Operations_BitCode, <br> max_Operations_BitCode, used_cycles_of_execution, ... ) |
| CLT(n).gradient_aim_valuation := CLT(n).aim_valuation − CLT(n-1).aim_valuation |
| all other column-assignments are declared adequate in the OLT-description in fig.6. |

*Fig. 20*

*OBT & CBT(i) value-assignments:*

| |
|---|
| OBT.Execution_counter := Execution_counter + 1 |
| OBT.FatalError_counter := FatalError_counter + ( 0 < OLT.Number_of_Exception ≠ Divide_Error, Overflow ) \|\| OLT.active_ChkSum_corrupt \|\| ` OLT.inactive_ChkSum_corrupt \|\| OLT.Exception_vect_changed \|\| OLT.Processor_Mode_changed ) |
| OBT.Jump_longOp_probability := MAX[ MIN[ Jump_probability +(OLT.OpCode_length_or_jump ≤ 0 ) +(OLT.OpCode_length_or_jump > 4), +127], -128] |
| OBT.avg_OpCode_jump_length := (execution_counter*avg_OpCode_jump_length + akt.OpCode_jump_length) / (execution_counter + 1) |
| OBT.OpCode_len_unconfirmed := OpCode_len_unconfirmed \|\| ( avg_OpCode_length ≠ act.OpCode_length ) |
| OBT.avg_cycles_of_execution := ( execution_counter * avg_cycles_of_execution + act.cycles_of_execution ) / (execution_counter + 1) |
| OBT.exec_cycles_unconfirmed := exec_cycles_unconfirmed \|\| (avg_cycles_of_execution ≠ act.cycles_of_execution ) |
| OBT.Register_write_probability := MAX[ MIN[ Register_write_probability + 2*[ ( min.Reg.ID ≤ ORT.Column_ID_OLT ≤ max.Reg.ID )&& ORT.value_before_change ≠ ORT.value_after_change ] - 1, +127], -128] |
| OBT.Register_copy_probability := MAX[ MIN[ MIN( Register_copy_probability + 2*[ ( min.Reg.ID ≤ ORT.Column_ID_OLT ≤ max.Reg.ID )&& ORT.value_before_change ≠ ORT.value_after_change &&( min.Reg.ID ≤ ORT.Column_ID_source ≤ max.Reg.ID ) ] -1, +127], -128] |
| OBT.Memory_write_probability := MAX[ MIN[ Memory_write_probability + 2*[ ( min.Adr.Reg.ID ≤ ORT.Column_ID_OLT ≤ max.Adr.Reg.ID )&& ORT.value_before_change ≠ ORT.value_after_change ] -1, +127], -128] |
| OBT.Memory_copy_probability := MAX[ MIN[ Memory_copy_probability + 2*[ ( min.Adr.Reg.ID ≤ ORT.Column_ID_OLT ≤ max.Adr.Reg.ID )&& ORT.value_before_change ≠ ORT.value_after_change &&( min.Adr.Reg.ID ≤ ORT.Column_ID_source ≤ max.Adr.Reg.ID ) ] -1, +127], -128] |
| OBT.Reg_to_Mem_probability := MAX[ MIN[ Reg_to_Mem_probability + 2*[ ( min.Adr.Reg.ID ≤ ORT.Column_ID_OLT ≤ max.Adr.Reg.ID )&& ORT.value_before_change ≠ ORT.value_after-change &&( min.Reg.ID ≤ ORT.Column_ID_source ≤ max.Reg.ID ) ] -1, +127], -128] |
| OBT.Mem_to_Reg_probability := MAX[ MIN[ Mem_to_Reg_probability + 2*[ ( min.Reg.ID ≤ ORT.Column_ID_OLT ≤ max.Reg.ID )&& ORT.value_before_change ≠ ORT.value_after_change &&( min.Adr.Reg.ID ≤ ORT.Column_ID_source ≤ max.Adr.Reg.ID ) ] ] -1, +127], -128] |
| OBT.Multi_Reg_write_prob := *like in* Register_write_probability , *but with min.2 appropriate* ORT.Column_ID_OLT *-entries.* |
| OBT.Multi_Mem_write_prob := *like in* Memory_write_probability , *but with min.2 appropriate* ORT.Column_ID_OLT *-entries.* |
| OBT.Multi_Reg_to_Mem_prob := *like in* Reg_to_Mem_probability , *but with min.2 appropriate* ORT.Column_ID_OLT + Column_ID_source *-entries.* |
| OBT.Multi_Mem_to_Reg_prob := *like in* Mem_to_Reg_probability , *but with min.2 appropriate* ORT.Column_ID_OLT + Column_ID_source *-entries.* |
| OBT.xxx_Reg_source\|dest_BitCode: *see table-description* |
| OBT.xxx_calculation_BitCode: *see table-description* |
| OBT.max_write_value := MAX( max_write_value, ORT.value_after_change ) |
| OBT.min_write_value := MIN( min_write_value, ORT.value_after_change ) |
| OBT.avg_write_value := ( execution_counter * avg_write_value + ORT.value_after_change ) / (execution_counter + 1) |
| OBT.max_write_gradient := MAX( max_write_gradient, ORT.value_after_change - ORT.value_before_change ) |
| OBT.min_write_gradient := MIN( min_write_gradient, ORT.value_after_change - ORT.value_before_change ) |
| OBT.avg_write_gradient := ( execution_counter * avg_write_gradient + ORT.value_after_change - ORT.value_before_change ) / (execution_counter + 1) |
| OBT.evaluated_source_[Num]Register := *probability-function*( xxx_Reg_source_BitCode, confirmation_counter ) |

*Fig.21*

| |
|---|
| OBT.evaluated_dest_Register[2] := *probability-function*( xxx_Reg_dest_BitCode, confirmation-counter ) |
| OBT.evaluated_Operation_ID := *probability-function*( xxx_Operation_BitCode, confirmation-counter ) |
| OBT.Confirmation_counter := Confirmation_counter + *exist*( *equivalent* OLT+ORT–*eintry with lower* IniConNr ) |
| OBT.max_aim_valuation := MAX( max_aim_valuation, OLT.aim_valuation ) |
| OBT.avg_aim_valuation := ( execution_counter * avg_aim_valuation + OLT.aim_valuation ) / (execution_counter + 1) |
| CBT(n).max_grad_aim_valuation := MAX( CBT(n)max_aim_valuation, CLT(n).aim_valuation ) - CBT(n-1).max_aim_valuation. |
| CBT(n).avg_grad_aim_valuation := ( execution_counter * CBT(n).avg_aim_valuation + CLT(n).aim_valuation ) / (execution_counter + 1) - CBT(n-1).avg_grad_aim_valuation |

Fig.21 (Continued)

3.2.2 ELT and EBT value-assignments:

| |
|---|
| ELT.max_Operations_BitCode := OLT.max_Operations_OpCode |
| ELT.min_Operations_BitCode := OLT.min_Operations_OpCode |
| ELT.Register_changed_BitCode := OLT.Registers_changed_BitCode |
| ELT.Register_source_BitCode := OLT.Registers_source_BitCode |
| ELT.Energy_Valuation := VFT.Energy_valuation_Function( SAC.Energy_Valuation_FunctionID, Energy_after, Energy_before, Registers_changed_BitCode, Registers_source_BitCode, min_Operations_BitCode, max_Operations_BitCode, used_cycles_of_execution, ... ) |
| ELT.Valuation_Function_ID := *for calculation of* Energy_Valuation *used* VFT.Valuation_Function_ID |
| EBT.avg_Energy_after := ( execution_counter · avg_Energy_after + ELT.Energy_after ) / (execution_counter + 1) |
| EBT.equal_value_probability := equal_value_probability + 2·( avg_Energy_after = ELT.Energy_after ) -1 |
| EBT.avg_Energy_gradient := ( execution_counter · avg_Energy_gradient + ELT.Energy_after - ELT.Energy_before ) / (execution_counter + 1) |
| EBT.equal_gradient_probability := equal_gradient_probability + 2·( avg_Energy_gradient = ELT.Energy_after–ELT.Energy_before ) -1 |
| EBT.xxx_Operations\|Registers_BitCode *see table-description* |
| EBT.avg_cycles_of_execution := ( execution_counter · avg_cycles_of_execution + ELT.used_cycles-of_execution ) / (execution_counter + 1) |
| EBT.avg_Energy_Valuation := ( execution_counter · avg_Energy_Valuation + ELT.Energy_valuation ) / (execution_counter + 1) |

Fig.22

3.2.3 Definitions needed to read the flowchart:

| directives | denotes a directive or a short sequence of directives.
⟨ *condition fulfilled ?* ⟩ Yes: branches horizontally, *No:* continue below.
( *continuing-label* ) denotes a label to or from another part of the flowchart.
| *block of directives* | denotes a block of earlier defined directives.

In the flowchart because of the complexity not all things are described until the smallest detail, but the fundamental functionality is presented clear and comprehensible.
Self-evident things like closing a database-cursor or cofilling not explicit mentioned but existing table-columns (which do not need a special algorithm) are not performed additionally, because the meaning of these columns is already declared in 3.1.2 an their assignment-formulas in 3.2.1 or in 3.2.2.
In the flowchart means *"generate ORT-entry and actualise OBT"* what is already shown in the value-assignments in fig. 19-21.

Fig.23

3.2.4 AC-flowchart:

a.) Initial Preparations:

| save all register-values. |
| ↓ |
| save all original exception-vectors. |
| ↓ |
| initialise processor by deleting all breakpoints, clear all flags in the control-register and clear all flags in the high word of the status/flags-register. |
| ↓ |
| create AC-database and load (respectively calculate) the initial table-values. |
| ↓ |
| capture all exception-vectors to own handlers. |
| ↓ |
| capture exceptions, which load additional data to the supervisor-stack, by a special exception-routine which considers the additional data. |
| ↓ |
| Misuse one exception-vector-routine to switch to the supervisor-mode and trigger this exception (processor switches into supervisor-mode and continues on this vector-address where the further flow of program is. |
| ↓ |
| Pop the onto the stack loaded $EFlags_\pi$/$Statusregister_\mu$ so, that when it's loaded the $Trace_\mu$/$Trap_\pi$-flag is set (to be in the single-step-mode then). |
| ↓ |
| Pop the $EIP_\pi$/$PC_\mu$ on the stack so, that when it's loaded by the return from supervisor-mode instruction, the processor continues on the memory where the test-opcode was located. |
| ↓ |
| Prepare initial test-values in ICT, which are loaded into the registers for the opcode-test so, that all register-values and destination-values of the address-registers have got different values. |
| ↓ |
| Initialise the DWord-opcode generator-counter to -1 = $FFFF.FFFF |
| ↓ |
| Initialise the IniConNr-counter to -32. |
| ↓ |

Fig.24a

AUTOMATIC PROGRAMMING

REFERENCES

First announcement of this utility-patent "Verfahren zur Generierung einer einfachen Form künstlichen Bewußtseins im Computer zur Befähigung selbsttätig planender Erstellung von Maschinencode-Programmen und deren Ausführung zur Lösung beliebiger gestellter Programmieraufgaben" was the Nov. 2, 1999 in Germany at the DPMA (deutsches Patent- und Markenamt=german Patent- and Trademark-Office).

SPONSORSHIP STATEMENT

There was no sponsor for this invention and I'm a single independent inventor.

BACKGROUND OF THE INVENTION

1. Field of the Invention

The present invention relates to computer programming, and more particularly to automatic code generation. It relates also to learn-capable programs and artificial intelligence.

2. Present State of the Art

Worldwide in the Field of Software-Development many employees are missing and the development tasks become larger and larger.

Until now a given conceptual formulation is conceived and programmed by Software-developers. For relieving the programming there are "Wizards" which offer the possibility to generate basic parts of source-code after making interactive inputs on dialog-windows by a fixed given generator-scheme.

Moreover company-specific scripts are written, which generate simple steadily repeated parts of source-code with variations on the same positions by reading out data out of ASCII-files.

In every case the user first has to develop the generating script and then has to write the ASCII data for to read out, or—in the case of "Wizards"—has to make user defined inputs and after the generation of the frame-sourcecode has to develop the intrinsic functionality of the program. After it the source-code has to be compiled to become executable. But such programs are not adaptive.

On the area of AI there are neuronal networks/fuzzy logic which can build expert-systems, which can absorb external attractions and have the capability to make adaptive decisions on these inputs, which means a kind of adaptive control system but they will not be able to plan and develop and execute machine-code an learn from its execution.

In the decision 20 W (pat) 12/76 of the german patent court artificial consciousness was tried to generated in a patent application by a reflexive chain of video cameras and monitors—this procedure has nothing to do with that method.

BRIEF SUMMARY OF THE INVENTION

It's an object of the invention to create computer based artificial consciousness.

It is another object of the present invention to provide a method for giving a computer the capability to learn programming for itself.

It's a further object of the invention to provide a system to make a computer plan and develop programs targeted to a pregiven programming-aim or to fulfill its basic needs.

Therefore it first captures all processor exception-vectors (for a single process-system) or task exception-vectors (for a multitasking version) by own analysis-routines.

Then the system generates numbers, puts them to a defined place in memory and then sets the instruction-pointer to that number for to execute it, like it would be a legal opcode.

Before the number is executed the processor's registers are set to predefined initial conditions and one number is executed several times using different initial conditions.

After every number-execution the system analyses, if an exception occurred or the number caused a jump or a write to memory and the concerned source- and destination-registers are determined and also the kind of instruction, which means its mnemonic. For every execution many theoretical source-registers and several possible commands are possible. Therefore one number is executed by many predefined different initial conditions to determine the concerned source-register and operation most exactly. By the sum of the execution analysis data the command concerned mnemonic and the source- and destination-registers are determined. So the system itself learns to program in machine-code.

Additional the absolute basic needs, which also have mono-cellars, are modelled: Pain means an attack to the program (=overwrite) and hunger means loss of energy, which is modelled by a defined register (hunger=low values).

The program has got two valuation-systems: one concerning the basic needs and one concerning the fulfillment of pregiven programming aim.

After single numbers are executed two-number-combinations are executed and the effects of these combinations are determined.

The valuation system determines if the combination is good or worse concerning the basic needs and the fulfillment of a pregiven programming-aim (it's possible to disable one of these two valuation-systems).

The programming-aim concerning valuation-function is dynamic, which means the value-range of its valuation-results is valuated by a meta-valuation-system—and if the valuation-results are not very meaningful, which means, they're clustered near the min/max-boundaries or near zero or another value, the valuation-function is changed by the valuation-system itself and a revaluation occurs. If then the valuations results are worse than before, the modification is quashed and another valuation-function modification is tried until the revaluation results in unclustered valuation-results.

When larger number-combinations are tried, the valuation-system omits to combine combinations which caused fatal exceptions, large jumps, extensive writing to memory, registers which should not be used, etc. or combinations which dislodge from the programming-aim. So not every additional number or combination in the total combination causes an exponential rise of needed calculation-time and disc-space.

The larger the combination becomes the more restrictive is the programming-aim specific valuation-system concerning additional numbers=opcodes or combinations. Then additional combinations must appropriate the programming-aim.

So the system learns to plan developing the desired routine. The solution-routines are retested by nearly all possible input-values and if it works fine it's valuated by needed clock cycles and memory space and the most effective solution-routine then is disassembled and can be taken by developers to implement it into their projects as a subroutine.

BRIEF DESCRIPTION OF THE DRAWINGS

FIGS. 2–18 show the names, datatypes, value-range and meanings of the table's columns—some with additional examples, how they're filled. These tables are described in sections 1.3.2.1 to 1.3.2.16.

FIGS. 19–21 show the value-assignments of the OxT and CxT—tables. Here the effects of the executions are analyzed, and the mnemonic and source+destination-registers are determined.

FIGS. 22 shows the value-assignments of the energyspecific tables ELT and EBT, which provide the analysis results of the actions concerning the modelled hunger.

FIGS. 23–24 show the flow-chart of the AC-program.

DETAILED DESCRIPTION OF THE INVENTION

| Contents: | |
|---|---|
| 1. SPECIFICATION | 7 |
| 1.1 Object of the invention | 7 |
| 1.2 Derivation of technical feasibility and Definition of artificial Consciousness | 7 |
| 1.2.1 Philosophical basic liberations | 7 |
| 1.2.2 Basic Approach for the Generation of Artificial Consciousness | 8 |
| 1.3. Technical Doctrine how to generate Artificial Consciousness | 8 |
| 1.3.0 Definition of the appropriated abbreviations | 8 |
| 1.3.1 Procedure for generating artificial consciousness by comprehensible words | 11 |
| 1.3.2 Creating the Database of the AC-Knowledge | 11 |
| 1.3.2.1 The Register-Identifikation-Table [RIT - FIG. 2] | 11 |
| 1.3.2.2 The Operation-Identification-Table [OIT - FIG. 4] | 12 |
| 1.3.2.3 The Initial-Condition-Table [ICT - FIG. 3] | 12 |
| 1.3.2.4 The OpCode-Register-Table [ORT - FIG. 5] | 12 |
| 1.3.2.5 The OpCode-Learn-Table [OLT - FIG. 6] | 13 |
| 1.3.2.6 The OpCode-BaseTable [OBT - FIG. 7] | 13 |
| 1.3.2.7 The Combinations-RegisterTables [CRT(i) - FIG. 8] | 13 |
| 1.3.2.8 The Combinations-LearnTables [CLT(i) - FIG. 9] | 13 |
| 1.3.2.9 The Combinations-Base-Tables [CBT(i) - FIG. 10] | 13 |
| 1.3.2.10 The Aim Solution Table [AST - FIG. 11] | 14 |
| 1.3.2.11 The Aim Description Table [ADT - FIG. 12] | 14 |
| 1.3.2.12 The Function-Identification-Table [FIT - FIG. 13,14] | 14 |
| 1.3.2.13 The Valuation-Function-Table [VFT - FIG. 15] | 14 |
| 1.3.2.14 The Status of the AC-Program [SAC - FIG. 16] | 15 |
| 1.3.2.15 The Energy-Learn-Table [ELT - FIG. 17] | 15 |
| 1.3.2.16 The Energy-Base-Table [EBT - FIG. 18] | 15 |
| 1.3.3 Preparing the initial State of the System | 15 |
| 1.3.4 Base-learning from execution of all single opcodes | 16 |
| 1.3.4.1 OpCode generation and execution | 16 |
| 1.3.4.2 Analysis of opcode-repercussion and saving the analysis-result | 17 |
| 1.3.5 Realisation of the basic needs | 18 |
| 1.3.5.1 Realisation of artificial pain | 18 |
| 1.3.5.2 Realisation of artificial hunger | 19 |
| 1.3.6 Planning on the criterions of the valuation-system | 19 |
| 1.3.7 The dynamic-reflexive valuation-system | 20 |
| 1.3.7.1 Valuation of the programming-aim closeness | 20 |
| 1.3.7.2 The dynamic energy-valuation-function | 21 |
| 1.3.8 Reaching Self-Consciousness, Reproduction and Evolution | 22 |
| 1.4. Conceptual Formulation of the Programming-Aim and Examples of Achievement | 22 |
| 1.4.1 Example_1: Developing a Program to compute the average | 22 |
| 1.4.2 Example_2: generation of a programs for computation of the cube-root | 23 |

Figure 24B:
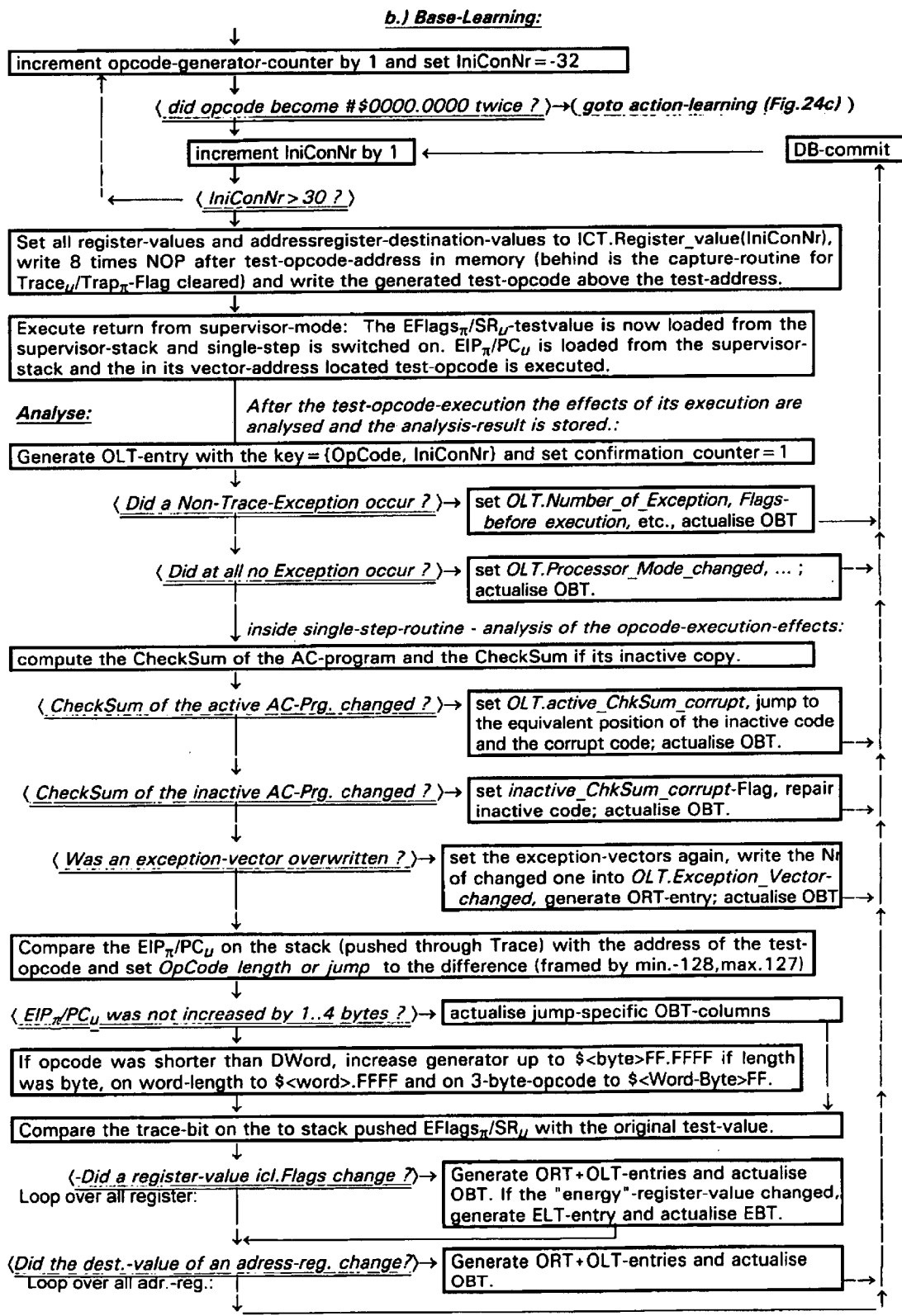
Figure 24C:
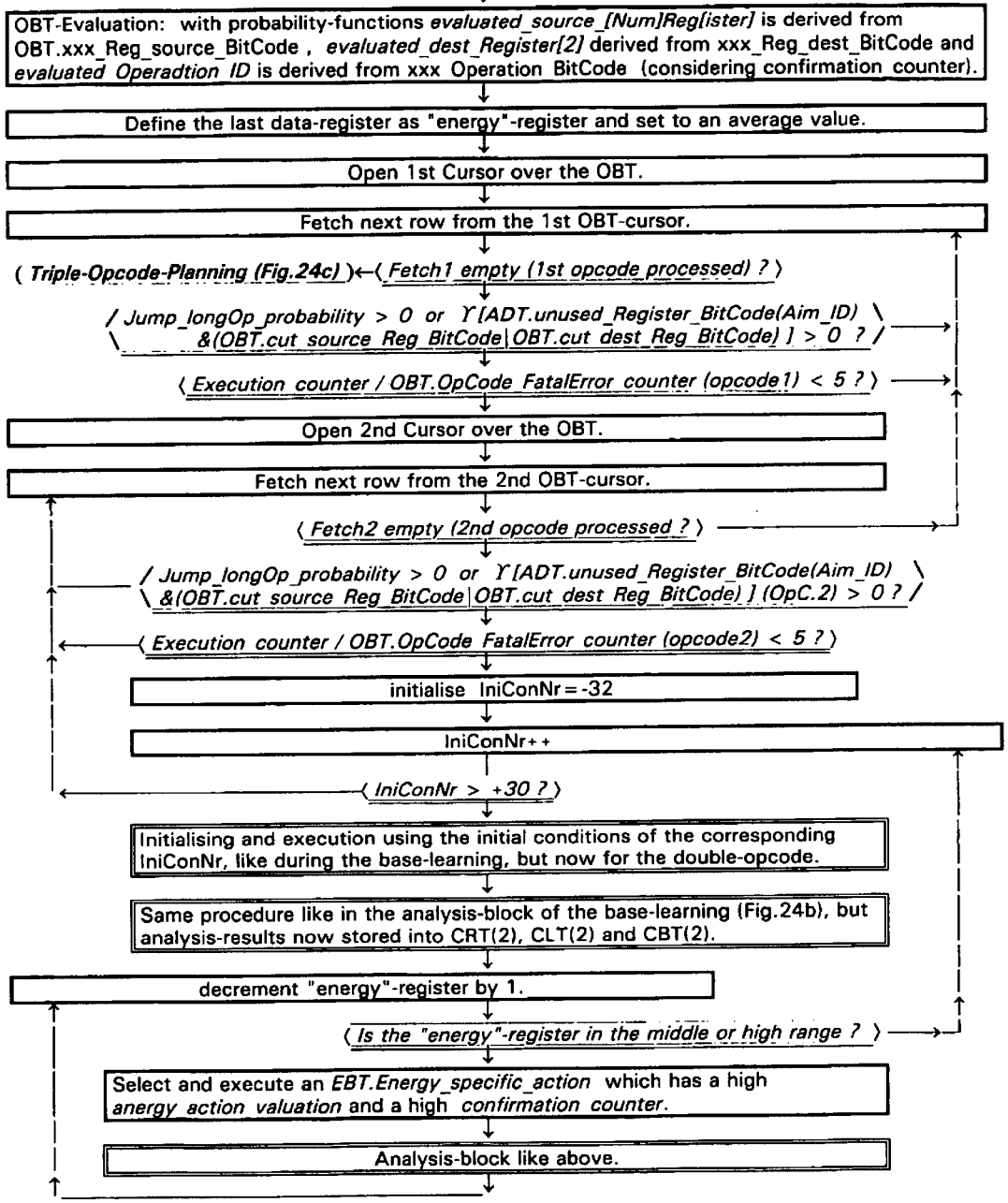
Figure 24D:
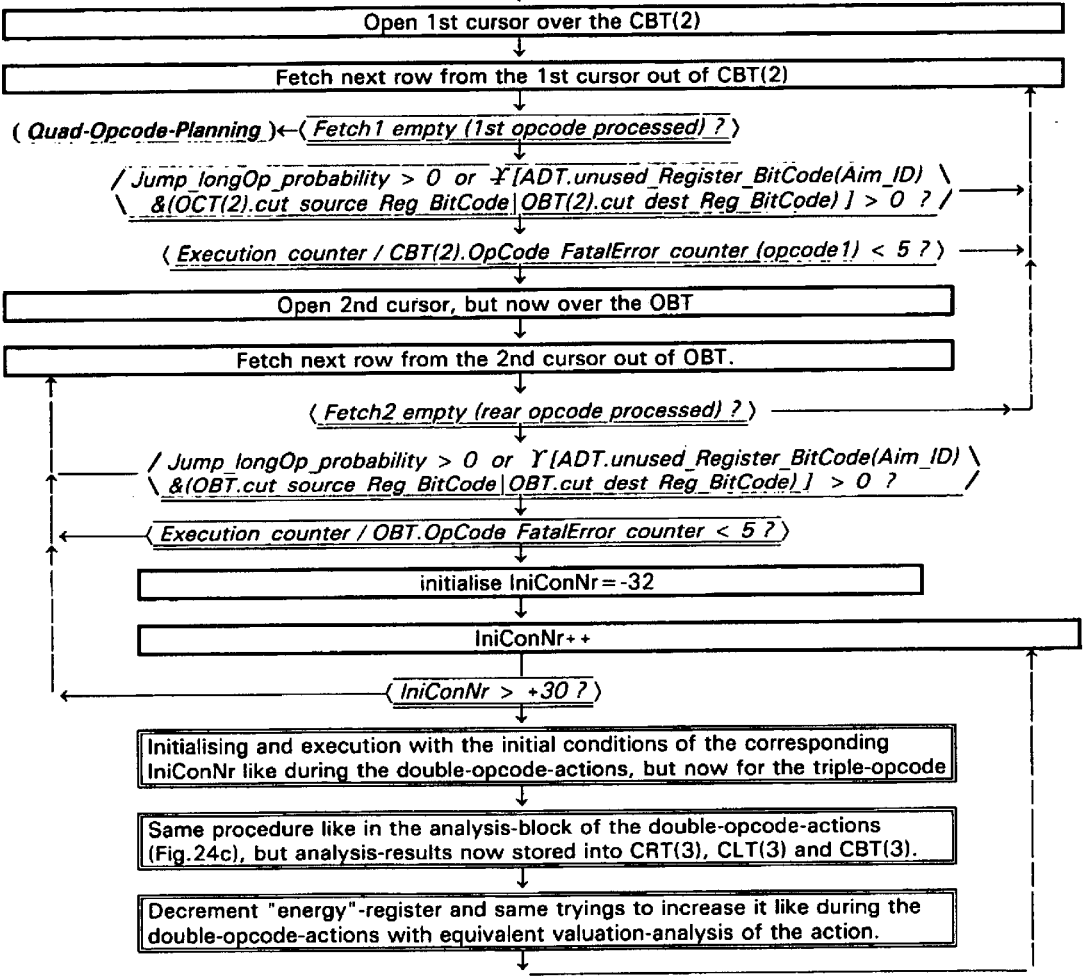

| -continued | |
|---|---|
| Contents: | |
| 1.5. Needed Hard-disk-Space and Oblivion | 24 |
| 1.5.1 Table sizes | 24 |
| 1.5.2 Oblivion | 25 |
| 1.6. Becoming Conscious | 25 |
| 1.7. Presentment of the Economic Advantages | 25 |
| 2. CLAIMS | 27 |
| ABSTRACT OF THE DISCLOSURE | 32 |
| 3. DRAWINGS | 1 |
| 3.1 Relational Database of the AC-knowledge | 1 |
| 3.1.1 FIG. 1 - ER-Diagram of the AC-Database | 1 |
| 3.1.2 Tables of the AC-Database | 2 |
| FIG. 2 - Register-identification-Table | 2 |
| FIG. 3 - Initial-Conditions-Table | 2 |
| FIG. 4 - Operation-Identification-Table | 3 |
| FIG. 5 - OpCode-Register-Table | 5 |
| FIG. 6 - OpCode-Learn-Table | 5 |
| FIG. 7 - OpCode-Base-Table | 6 |
| FIG. 8 - Combination-Register-Table | 7 |
| FIG. 9 - Combinations-Learn-Table | 7 |
| FIG. 10 - Combinations-Base-Table | 7 |
| Programming-aim and valuation-function tables | 8 |
| FIG. 11 - Aim-Solution-Table | 8 |
| FIG. 12 - Aim-Description-Table | 8 |
| FIG. 13 - Functions-Identification-Table (for SQL-functions) | 8 |
| FIG. 14 - Functions-Identification-Table (for machine-code functions) | 10 |
| FIG. 15 - Valuation-Function-Table | 11 |
| FIG. 16 - Status of the Artificial Consciousness | 11 |
| FIG. 17 - Energy-Learn-Table | 12 |
| FIG. 18 - Energy-Base-Table | 12 |
| 3.2 Flowchart of the AC-Program | 13 |
| 3.2.1 CxT(i) value assignments | 13 |
| FIG. 19 - ORT & CRT(i) value assingments | 13 |
| FIG. 20 - OLT & CLT(i) value assingments | 13 |
| FIG. 21- OBT & CBT(i) value-assingments | 14 |
| 3.2.2 FIG. 22 - ELT and EBT value-assignments | 15 |
| 3.2.3 FIG. 23 - Definitions needed to read the flowchart | 15 |
| 3.2.4 AC-flowchart | 16 |
| FIG. 24a - Initial Preparations | 16 |
| FIG. 24b - Base-Learning | 17 |
| FIG. 24c - Double-OpCode-Acting | 18 |
| FIG. 24d - Triple-OpCode-Planning | 19 |

1. SPECIFICATION 1.1 Object of the Invention

The objects of the invention are:

a) to provide automatized software-development, b) to create computerbased artificial consciousness.

With this method a simple form of artificial consciousness is generated using a computer, which acts aimless and arbitrarily in the beginning, but has the capability to learn from the effects of all its "behaviour", for to, when it knows the effects of every single behaviour or behaviour pattern (=combination), has the capability to join together its single actions targeting to a given aim or fulfilment of basic needs.

1.2 Derivation of Technical Feasibility and Definition of Artificial Consciousness 1.2.1 Philosophical Basic Liberations ( . . . are normally no ingredient of a patent specification, but indispensable for the explanation of the technical feasibility)

If the prerequisite of consciousness of man would be a kind of soul which would be adventitious between cygot and birth, it world be possible to locate it by cogitation experiment:

If you would cognitive cut the head and provide the carotids with oxygen and nutrient containing blood, the consciousness would surely be located in the head.

If you would isolate the brain expect of the factitious supply, no conventionally information flow between the individual and the environment would be possible, but the "I am"-consciousness would surely be present.

Over it it's theoretical now possible to cut the cerebral lappets for seeing, listening, smelling, tasting, feeling, equilibration, speech and the cerebellum and nothing more would be lost.

If the front cerebral lappets would further be cut, you'd loose the possibility to compute with present knowledge and on the cut of several upper cerebral lappets you'd loose reminiscence, but the deepest basic "I am" would be remaining.

If a kind of soul would exist, it would be located on the upper End of the phylum brain ##.

Under consideration of the fluent evolution the primates would have a "soul" too; and other mammals too; and all other animals too; and the single-cellars too; and plants too; and consequently every cell of a multicellular life form too.

A border of a "soul-adventitious" or an "I am"-consciousness between the life forms is missing.

Every cell of our body ought have its own soul (the evolutionary specialisation to neural-cells is, equivalent to the prenatal cell-fissions, fluent).

A soul does not exist (it's not necessary to build consciousness).

Consciousness originates during the evolution compulsively automatically.

Inside the "dead" molecule of the DNA is the construction plan for generating consciousness.

Consciousness originates by valuation of the own actions and its effects, with the reflection of the valuation-results on the adapting dynamic valuation-method.

If no soul is necessary for generating consciousness, but only the complex "program" of DNA, then consciousness is also generatable by a complex reflexive computer-program.

1.2.2 Basic Approach for the Generation of Artificial Consciousness:

The doing of all, including the plainest individuals conduces the fruition of its basic needs.

These basic needs are:

a) no achiness:=no attack against the own system and b) no hunger:=no imminent loss of energy A complex program, in which these basic needs are modelled, and which can act freely and has the possibility to learn reflexively what its actions effectuate (like a child) and can reflect if its actions improves its situation in reference to its basic needs, builds up a valuation-system, an then plans with the actions from its learned knowledge and reflects again and so attains consciousness. When it later scans its own machine-code and then tests every of its opcodes and after it all opcode-combinations it discerns the effect of its opcode-combinations and their context and so attains self-consciousness and now has the possibility of self-reproduction and the aware improvement of its machine-code while reproduction and so starts its evolution (its so effective like man could improve its DNA while mitoses/meiosis implementing its experience of life).

1.3. Technical Doctrine how to Generate Artificial Consciousness 1.3.0 Definition of the Appropriated Abbreviations:

The programming works on every computer with any processor and on any operating-system. In the following μ-indexed abbreviations correlate with Motorola processors, π means Intel processors, and ψ-indexed denote PowerPC-RISC-Processors.

--- eq. = equivalent
$ASR_\psi$ = Adress Space Register
$BAT_\psi$ = BAT-Registers
BC = BitCode: every Bit correlates with a Flag and combinations are allowed.
$CCR_\mu$ = Condition-Code-Register (= Flags: EXtension, Negative-, Zero-, Overflow-, Carry-)
CISC = Complex-InstructionSet Computer (p.e. $IA_\pi$ and $MC_\mu$)
CPU = Central processing unit = Prozessor
$CR_\psi$ = Condition-Register (CR 0 . . . 7)
$CR_\pi$ = Control-Register
$CTR_\psi$ = Count-Register
$DABR_\psi$ = Data Adress Breakpoint Register
$DAR_\psi$ = Data Adress Register
DB = DataBase
$DEC_\psi$ = Decrement-Register
$DR_\pi$ = Debug-Register
$DSISR_\psi$ = DSI Status-Register shows the reason for DSI- and Alignment-Exceptions.
EA = Effective Adress (memory access without using a register)
$EAR_\psi$ = External Access Register
$Rseg_\pi$ = Segment Register: CS; SS; DS, ES, FS, GS
$EFlags_\pi$ = 32-Bit-Register with the System-Flags: IDent-, VirtualInterruptPending-, VirtualInterruptFlag-AlignmentCheck-, Virtual8086Mode-, ResumeFlag-, NestedTask, InputOutputPrivilegeLevel, OverflowFlag, DirectionFlag, InterruptEnableFlag, TrapFlag, SignFlag, ZeroFlag, Auxiliary/Align-CarryFlag, ParityFlag, CarryFlag.
$EIP_\pi$ = Extended Instruction Pointer ($\hat{=}PC_\mu$)
ER = Entity Relationship (database-model)
$ESP_\pi$ = Extended StackPointer ($\hat{=}USP_\mu$)
Exc. = Exception$_\pi$: #DeviceError, #DeBug, NMI IRQ, #BreakPoint, #OverFlow, #BoundRange exceeded, #UD (Invalid Opcode), #NM (device not available), #DoubleFault, invalid #TaskSwitch, Segment #NotPresent, #SS (StackFault), #GeneralProtection, #PageFault, #MF (FloatingPoint-Error), #AlignmentCheck, #MachineCheck.
Exception$_\mu$: Reset, BusError, AdressError, invalidOpCode, Div/O, CHK, TrapV, PrivilegeViolation, Trace, Interrupts, Traps.
Exception$_\psi$: System-Reset, Machine-Check, DSI, ISI, Ext.Interrupt, Alignment, Program, Floating-Point unavailable, Decrementer, System Call, Trace, Floating-Point Assist.
FFT = fast Fourier-Transformation
FK = Foreign Key of a ER-Database-table
$FPR_\psi$ = Floating-Point Register 0 . . . 31
$FPSCR_\psi$ = Floating-Point Status and Control Register
GB = GigaBytes = $2^{30}$ Bytes
GPR = General Purpose Registers: on Pentium$_\pi$: EAX, EBX, ECX, EDX; ESI, EDI, EBP; ESP; EIP on Power $PC_\psi$: GPR 0 . . . 31; and on Motorola$_\mu$ the Data- and Adress-Registers.
IA = Intel-Architecture
IRQ = Interrupt-Request
AC = Artificial Consciousness
kB = kiloBytes - $2^{10}$ Bytes
Id = Logarithm dualis = $\log_2$
$LR_\psi$ = Link-Register
MB = MegaBytes = $2^{20}$ Bytes
$MSR_\pi$ = Model Specific Register
$MSR_\psi$ = Machine State Register
NMI = Non-Maskable-Interrupt (highest Interrupt)
NOP = NoOperartion-OpCode [=opcode without effect (except increment of $I_\pi/PC_\mu$)]
OLB = OpCode Lower Byte = last byte in the opcode
$PC_\mu$ = Program-Counter (=Pointer to the first byte in memory where the processor starts to fetch and execute an opcode)
PK = Primary Key of a ER-database-table
$PVR_\psi$ = Processor Version Register
RISC = Reduced-InstructionSet Computer (p.e. PowerPC$_\psi$)
$RTE_\mu$ = instruction: return from exception (loads SR and PC from Supervisor-Stack)
$SDR1_\psi$ = SDR1-Register -continued SPRG$_\psi$ = SPRG 0 . . . 3
SR$_\mu$ = StatusRegister (Flags$_\mu$: Trace-, Supervisor-, +Interrupt-Maske:
I$_2$ I$_1$ I$_0$, +CCR-Flags)
SR$_\pi$ = Segment Registers: CS, DS, SS, ES, FS, GS
SR$_\psi$ = Segment Registers
SRR$_\psi$ = Save/Restore-Register of Machine-Status
SSP$_\mu$ = Supervisor-StackPointer (A7 in Supervisor-Modus)
TB$_\pi$ = Time Base Facility: Time-Counter → 2$^{64}$-1
TR$_\pi$ = Table-Register: GDTR, IDTR, LDTR, TR
USP$_\mu$ = User-StackPointer (Aderessregister A7 in User-Mode, A7' in Supervisor-Mode)
= = correlates
$ = begin of a hexadecimal number
ζ = result of bit-by-bit-AND over all following values
[=V$_1$ & V$_2$ & . . . & V$_n$]
Ξ = result of bit-by-bit-OR over all following values [=V$_1$ | V$_2$ | . . . | V$_n$]
γ = number (sum) of the set Bits in the following value
[=(1&V) + (2&V)/2 + (4&V)/4 + . . . ]
∀ = for all of the following . . .
∀$^-$ = for all other . . . (except the following)

1.3.1 Procedure for Generating Artificial Consciousness by Comprehensible Words:

A computer system attains consciousness, if the active program, in which basic needs are modelled (see 1.3.5), has captured all exception-vectors and proceeds as follows:

Generate a normal number, write it somewhere in the memory, put the program-counter=instruction-pointer on it and execute it like it would be an opcode (=machine-code-command) and analyze, what its execution caused and proceed so with all numbers→opcodes (until a maximum length) with many representative initial conditions (register-values and reference-contents of address-registers).

Then use the saved opcodes which seldom caused an exception while using several initial conditions and evaluate if its execution increased or decreased its situation in due to its basic needs.

Combine the opcodes, which didn't decrease the own situation, and evaluate the effects of the code-combination using several initial conditions and save the result of analysis. Plan combinations of those opcode-combinations which would increase the well being referable to the basic needs or could fulfill or approximate a given programming aim.

Figure 1:
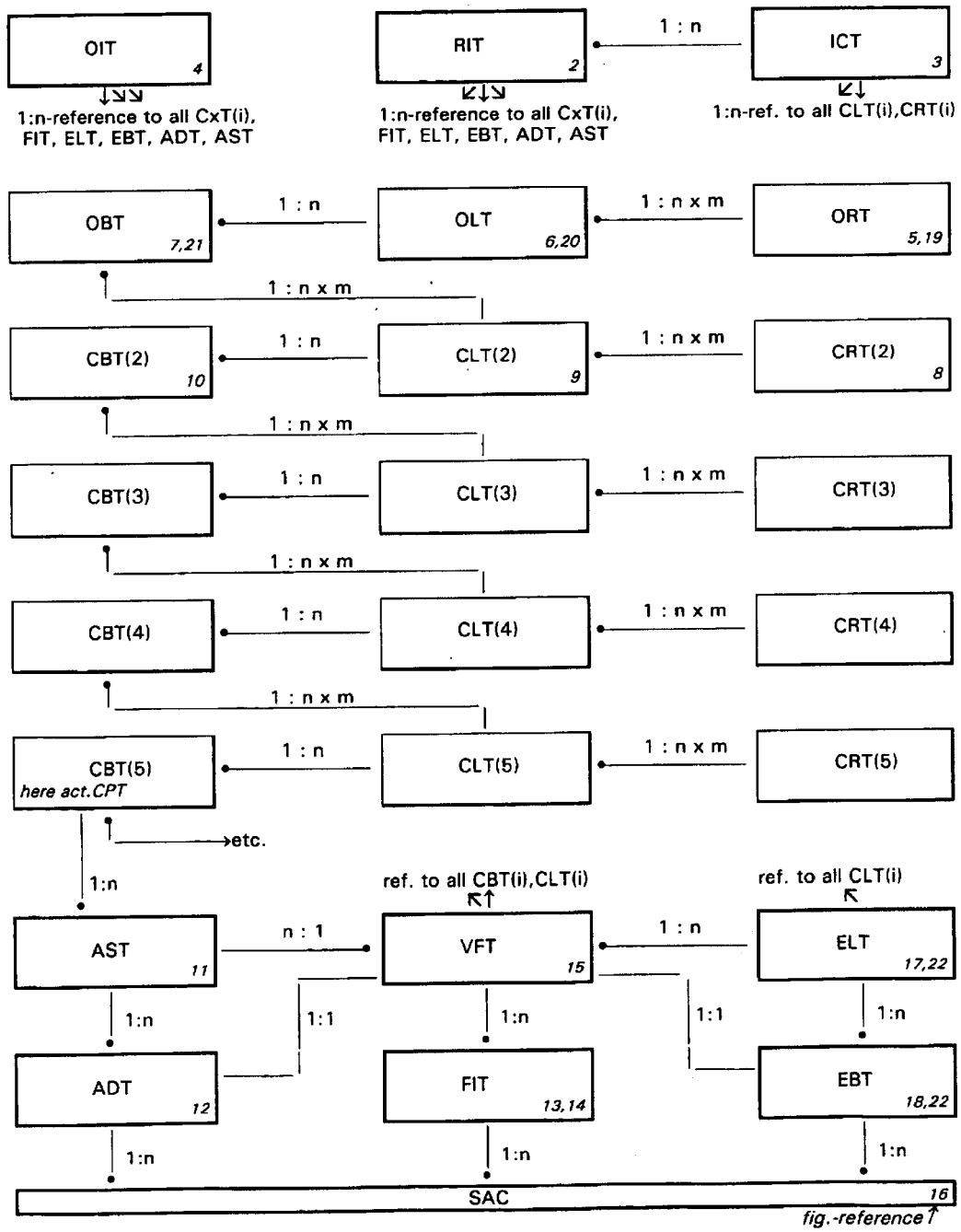
FIG. 1 shows the ER-diagram of the database-tables which contain the data of the AC-program. The in the middle shown CLT(i)—tables are created dynamically. The database is described in section 1.3.2.

1.3.2 Creating the Database of the AC-Knowledge:

For to have the learned from actions persistent, and for to have convenient access to the large quantity of data, a relational database system with its tables and relations shown in 3.1 is created. For to increase access and to save hard disk capacity, equivalent primary keys in clusters and additional indexes for often used non-PK-rows. The ER diagram is shown in FIG. 1.

Processor-dependant and in dependence of the number of 32-Bit-OpCodes, the database can grow very large and so the access speed according to it slow. Therefore RISC-Processors are more applicatively for the AC-Procedure than CISC-Processors. But CISC-Processors, like in the IA, use not very much opcodes which are longer than 24 bit, wherefore it's possible to have with striped tables and additional index-hard-disks and a higher "obliviousness" on inefficient opcode-combinations, an acceptable performance too.

The hard disc space problem in discussed in 1.5.

1.3.2.1 The Register-Identifikation-Table [RIT—FIG. 2]:

In the RIT the individual descriptors of the processor-registers and -vectors are typed first: Every Register gets a correlated identification-number, an assigned bit in the BitCode, a character describing the register-type, a consecutive number of the register-type and an optional description of the register. The register of the processor-flags (EFlags$_\pi$/SR$_\mu$) gets the Register_ID #0. The exception-vectors mostly are located in memory and are no internal processor-registers—to identify most of these important vectors they get a Register_ID with negative sign, which correlates with the exception-number. [If exception #0 is not RESET but a real exception, then all exception-vector Register_IDs are displaced by 1: Register_ID=−(ExceptionNr+1).]

FIG. 2b shows a Motorola example of the RIT.

1.3.2.2 The Operation-Identification-Table [OIT—FIG. 4]:

Like in the RIT the registers, here in the OIT the most important operations get an identification number and a bit in a BitCode.

The Operation_Type pigeonholes the operation to an operation group, described in FIG. 4c.

The Operation_Mnemonic (needn't to be exact like using assembler) and the optional Operation_Description describe the basic command.

1.3.2.3 The Initial-Condition-Table [ICT—FIG. 3]:

Because of equal opcodes could cause different effects, in this table many representative initial conditions referring to all positive Register_IDs are pregiven here. For every initial condition number (in the FIG. 3-example: −31 . . . +30) for all positive Register_IDs a sample of initial conditions is generated, p.e. using the Function in FIG. 3b. But only for all registers, which could contain mathematically used numbers, like data-registers, address-register-references and in the decremented reference of it [to include the command—(adr.reg.)], floating-point-registers and other special calculation-register (like p.e. MMX).

With the content of the address-registers it's surely possible to calculate too, but their values mostly refer to values in memory, where the predefined reference-values of the are located. Therefore the initial conditions of the address-register-values should only gyrate circadian through the references.

The Status$_\mu$/EFlags$_\pi$-Register higher bytes are always filled with the same initial conditions from SAC.actual_Processor_Mode. The ConditionCodes in the lowest byte of Status$_\mu$/EFlags$_\pi$ have got variable initial conditions. With the Control-, Debug- and Machinestate-Registers and the other special registers is dealt carefully too—the always get the same default-values.

1.3.2.4 The OpCode-Register-Table [ORT—FIG. 5]:

For every form initial values by opcode-execution changed (destination-) register, in a loop over all possible source-registers it's ascertained which possible operation-types of the OIT could caused the value in the changed (destination-) register.

For every appropriate source-destination-register-combination a table-entry is generated (unitary operators get the Register_ID_source=−1) and for every matching operation-type between possible source and destination the OIT-belonging Operations_BitCode-bit is set [p.e. 2+2= 2*2=2^2=2<<1=2|4= . . . =4 for one or two source registers 2 (the other could be a constant) and one destination-register 4].

The ORT-columns are described in FIG. 5 and FIG. 19 contains the value-assignment-algorithms.

1.3.2.5 The OpCode-Learn-Table [OLT—FIG. 6]:

The OLT is a subsumption of the effects of the actual opcode on the various used initial conditions. In the first 6 columns informations of fatal effects of opcode-execution are collected. Then there's the difference between the instruction-pointer=program-counter-value after and before opcode-execution and after it the condition-codes which could have caused a jump [redundant to ICT.Register_Value(Register_ID=0)].

Then in Register_changed_BitCode and Register_source_BitCode the Bits of all possible destination- and source-registers follow out of the belonging ORT-entries and after it in max_Operation_BitCode and min_Operation_BitCode the bitwise ORed and ANDed BitCodes of the ORT.Operations_BitCode-Entries.

The duration and time of opcode-execution are stored, and in aim_valuation analog VFT.Valuation_Function (ADT.aim_Valuation_FunctionID) it's appraised, how valuable the opcode-execution is in reference to reaching the programming-aim (value-assignment is shown in FIG. 20).

1.3.2.6 The OpCode-BaseTable [OBT—FIG. 7]:

The opcode-base-table shows the ascertained total effect of one opcode in reference to all initial conditions. FIG. 21 explains, how the evaluation (column-filling) happens, for so getting a "warrant of apprehension" of the opcode.

The OBT contains the resume of all executions of the opcodes, which later is necessary for the aim-directed planning of code combinations.

1.3.2.7 The Combinations-RegisterTables [CRT(i)—FIG. 8]:

The Combinations-RegisterTables are created dynamically, built analog the ORT, with the difference, that effects of opcode-combinations are analysed here. So the CBT(2) has got one more opcode in the primary key than the OBT=CBT(1), and CBT(3) has got three opcodes, etc.

1.3.2.8 The Combinations-LearnTables [CLT(i)—FIG. 9]:

Here the same is valid, like in the CRT(i). Analogous the OLT, one CLT(i)-row contains the effects of one opcode-combination in reference of the used initial conditions.

Here first the column CLT(i).gradient_aim_valuation gains importance. While it was identical to aim_valuation in CLT(1)=OLT, in CLT(i≧2) it contains: CLT(i).aim_valuation—CLT(i−1).aim_valuation (see third line of FIG. 20).

1.3.2.9 The Combinations-Base-Tables [CBT(i)—FIG. 10]:

Analogous the CBT(i) show the resume of the effects of all initial conditions in reference to one opcode-combination. The value-assignments are shown in FIG. 21. CBT(n) (where n is the largest i) is the combination-plan-table—it's the place where the aim-solution-program originates.

If ADT.aim_fullfilled_Flag_Function(CPT-PK)=1 (TRUE), the solution-program of the given aim is found and it'll be enrolled into the AST.

7.3.2.10 The Aim Solution Table [AST—FIG. 11]:

For every given programming abandonment the found solution-programs, their lengths, execution-times and used registers and operations (→bitcodes) are enrolled here.

7.3.2.11 The Aim Description Table [ADT—FIG. 12]:

The ADT assigns to every programming aim an identification-number, a short description, one bitcode-combination of the source- and one of the destination-registers which should be used (if possible) and one bitcode-combination of forbidden source- and one of forbidden destination-registers; further a string of former solution-programs which could be implemented, and a aim-solution-flagfunction which returns TRUE if the opcode-combination (program) solves the problem for the desired source- and destination-registers and finally an identifier which references to the valuation_function in the VFT, that appraises the closeness to the complying programming-aim, which is among others dependant of this aim-solution-flagfunction.

1.3.2.12 The Function-Identification-Table [FIT—FIG. 13, 14]:

In the FIT basic subfunctions are provided, which can be used for composing the energy valuation-function.

It's introduced in two variations:
a.) for generating a dynamical valuation function in SQL,
b.) for generating a dynamical valuation function in machine-code.

The alterable building of a valuation function is easier to accomplish in SQL, but the execution-time in machine-code is much faster and every new composed SQL-valuation-function has to be parsed again.

In the future the valuation-function should only be composed in machine-code. This has the additional advantage that the AC-program could use some solved solution-functions again as subfunctions in the FIT for later use for composing the valuation-function.

1.3.2.13 The Valuation-Function- Table [VFT—FIG. 15]:

The VFT contains the dynamic valuation-system in reference to the own "well being" (energy-register) and to the closeness to the programming aim(s).

The VFT.Valuation_Function(Type='E', SAC.Energy_Valuation_Function_ID ) appraises energyspecific actions and the Valuation_Function(Type='A', SAC.Aim_Valuation_FunctionID) the closeness to the programming aim(s).

The VFT.Function_ID_Chain contains the concatenation of the FIT.Function_ID's, that means the execution-chain of the subfunctions: Here causes NUM (see FIG. 13P$b$), that the following value is used as a number of byte-length, VALUE denotes that the following value is the column-number of the CPT=CLT(n), from which actual row the value is taken, EREG means the Register_ID of the energy-register, S/D_REG denotes the value out of ADT.all_source/dest_Registers_BitCode and AIM_F is the result of the ADT.aim_fulfilled_Flag_Function. The unitary operations operate on the last result of the Function_ID_Chain and the binary operations on the last two results.

On every accommodation, enhancement, or other amelioration of these valuation-functions the Valuation_Function_ID is incremented and a new entry with the modified Valuation_Function is created and the efficiency of all valuation-functions are reappraised: VFT.Valuation_Function_value=SAC.Energy/Aim_self_valuation_Func( . . . )], for to have an efficiency-gradient for further improvements.

The functionality of the dynamic valuation-system is described in 1.3.7.

1.3.2.14 The Status of the AC-Program [SAC—FIG. 16]:

This table has no primary key and only one row. It contains status-informations of the AC-Program and two self-valuation-functions, which appraise the efficiency of the energy-valuation-function and of the valuation-function of the programming-aim-closeness (VFT) by evaluating the range of their valuation-results.

These self-valuation-functions are, in opposite to the energy- and aim-closeness valuation-functions, not modifiable by the AC-program itself, but can be changed by the user.

1.3.2.15 The Energy-Learn-Table [ELT—FIG. 17]:

In the ELT data are stored about all energy relevant actions over the actual initial conditions, that means for all opcodes and code-combinations, which pertain the last data-register.

The valuability of an energyspecific action is appraised according to ELT.Energy_valuation=VFT.Valuation_Function(SAC.Energy_Valuation_Func_ID).

1.3.2.16 The Energy-Base-Table [EBT—FIG. 18]:

Like in the CBT(i) for programming-aim-closeness, in the EBT the effects of energy-changing opcode-combinations for all initial conditions are collected.

1.3.3 Preparing the Initial State of the System

For to reset the system later into the initial state without booting, several pointers have to be latched. Afterwards all exception-vectors are intercepted by own routines, because of the initial trying to use arbitrary numbers as machine-opcodes, although many of these trying cause fatal exceptions, because they're illegal opcodes (not usable) or the opcode causes an exception on one of the initial conditions. Abnormal system end would be the consequence, if not all exception-vectors would be captured.

In the case that the AC-program should run preclusively, you'll have to

- a.) stop multitasking by disabling it by an operating-system routine or by setting the IRQ-mask of the processor to NMI.
- b.) save all system-exception-vectors.
- c.) set all system-exception-vectors to own analysing and handling routines. or if it should later run with other programs or perhaps with further AC-programs:
- a') increase own task-priority.
- b') save all task-exception-vectors.
- c') set the task-exception-vectors of the AC-program to own analysing and handling routines.
- d.) save the statusregister$_\mu$(EFlags$_\pi$) and the user-stackpointer.
- e.) save the values of the other address-registers and of the data-registers.
- f.) save the values of the segment-, control-, debug- and special-registers.
- g.) set exception-vectors, which load additional data to the supervisor-stack (p.e. on address-violation-exception several processors load additional information like access-address and opcode onto the supervisor-stack) to a this fact considering interceptor-routine.
- h.) set the privilege-violation-exception-vector to a special capturing routine.
- i.) set one trap-vector to a routine, where the system should continue inside the supervisor-mode after this trap occurs.
- j.) execute this trap intentionally to change the CPU-mode from user-mode to supervisor-mode (the system now continues on the above set routine).
- k.) set the trace-exception-vector to an own trace-routine for later effect-analysis after number-as-opcode execution.
- l.) set the bits in the first word on the supervisor-stack so, that when the SR is loaded from SSP, the trace-Flag is set and the IRQ-mask is set to NMI (p.e. this is #$8700 on Motorola) because while the following base-opcode-learning no interrupt should be possible and after execution the effects should be analysed.

See referring to this FIG. 24a.

1.3.4 Base-learning From Execution of all Single Opcodes:

1.3.4.1 OpCode Generation and Execution:

- a.) Generate a 32-Bit-Number as an opcode, starting on #$0000.0000, later increase by 1. [if you already know the CPU instruction set, you can skip the opcodes which would overwrite memory (p.e. memory-move-commands).]
- b.) Set data- and address-registers, and the address-register destination-values and the values one DWord below on predefined test-values (initial conditions) and clear the condition-codes in EFlags$_\pi$/CR$_{\mu\psi}$(or use several initial conditions too).
- c.) Write the above generated opcode into the test-location in memory. Then fill the memory behind with zeros up to the maximum possible opcode-length, if zeros mean the mnemonic "ORI #0, Reg. 0" (or another effectless command) or fill with NOPs.

This is necessary because on a long command the zeros are not meaningless [and then often less destroying (p.e. memory overwriting) than the NOP-corresponding opcode-number], and on a few processors a clearing of the trace-flag is possible in the while execution used user-mode too, which effects the execution of the following numbers as opcodes too [if now the zeros are not effectless, NOPs have to be used to prevent further effects (like memory- or program-selfoverwriting)].

After these zeros or NOPs the Trace-Bit-Cleared handler is following.

- d.) Set content of the supervisor-stack, which is loaded by return from supervisor-mode into important user-registers like EFlags$_\pi$/Status-Register$_\mu$, IP$_\pi$/PC$_\mu$, etc., so, that CCR will be cleared or set on initial conditions, IRQ mask will be set to NMI, the trace-bit will be set and the supervisor-bit[mask] will be cleared and the DWord behind is the location of the test-opcode. Now execute the return from supervisor-mode by the corresponding opcode-command (p.e. RTE$_\mu$): EFlags$_\pi$/Status-Register$_\mu$ is now loaded by above described values and the test-opcode executes, because IP$_\pi$/PC$_\mu$ is loaded by its address.

If now a fatal exception occurs (except trace, p.e. privilege violation, etc.), the kind of exception is briefly shown graphically if desired, and it will be continued by generating and executing the next opcode.

If an initial condition dependant exception occurs (like address error, division by zero, . . . ), a relation between initial condition an exception is analysed [attention: on several exceptions, because of trace, an in many literature not documented combination of both exceptions (internal processor handling) can occur (p.e. using M68000 on Trap, Chk, Div/0 in combination with Trace).]

If no exception occurs (not even trace) the opcode-execution cleared the trace-bit (should never occur while executing single opcodes) and the handler behind the opcode is executed.

On Trace-Exception (normal case) a usable opcode was generated which execution-effects have to be analysed now.

1.3.4.2 Analysis of Opcode-Repercussion and Saving the Analysis-result:

- a.) After execution the EFlags$_\pi$/Status-Register$_\mu$ and the data- and address-registers and the reference-values of the address-registers an the reference-values one DWord below an the user-stackpointer are saved for analysis.
- b.) Verifying the own machine-code-checksum (of AC-Prg.) and the inactive copy in RAM (both without test-opcode placement): If checksum changed, the AC-program injured itself while executing the test-opcode (overwrote own parts of program). The corresponding corrupt-flag is set in the table. If the active version checksum changed jump into the inactive version, then compare both versions byte by byte and repair the corrupt version by replacing the bytes in the version with the changed checksum by the bytes from the version with the correct checksum.

c.) Check the supervisor-bitmask of the saved user-stackpointer on the supervisor-stack: If the processor was in supervisor-mode before jumping into the exception-handler, although he was in user-mode during test-opcode execution, a combination of the normal trace-exception with a low-priority-exception occurred [p.e. on Motorola Div/0-, Trap- or Chk-Exception (not documented in the M68000er handbook)]. That means the processor first fetched the exception-vector of the just occurred low-priority-exception and loaded the statusregister and the program-counter onto the supervisor-stack and then he jumped, while being in this processor intern routine, before starting the corresponding handler of the exception-vector, into the trace-exception-routine, which caused a further loading of the program-counter and the status-register (where now the supervisor-bit(mask) is set) onto the supervisor-stack.

By analysing the supervisor-bit(mask) on the supervisor-stack, it's now detectable, that before trace another low-priority-exception occurred; and by comparison of the second saved program-counter below on the supervisor-stack with the low-priority exception-vectors, now the primary exception before trace is detectable, which corresponding exception-number is stored.

d.) Comparison of the $IP_\pi/PC_\mu$ on the supervisor-stack with the address (placement) of the test-opcode-address: If the $IP_\psi/PC_\mu$ decreased, stayed unchanged, or increased by a value, which is larger than the longest possible opcode, the test-opcode was a jump-command.

If the $IP_\psi/PC_\mu$ increased by 5 or more bytes and less than the longest possible opcode, it was a long opcode or a short forward jump. If no registers changed from initial conditions it was a short jump.

This analysis-result is stored too.

e.) Comparison of the $EFlags_\pi/Status-Register_\mu$ and of all register-values and of the address-register destination-values and of the destination-values one max. address-length below [because of —(Adr.Reg.)], with the original-values.

In a bitmask now it's flagged which registers or its destination-values changed and it's analysed, which operations on which source- and destination-registers could have happened (heeding changes of $EFlags_\pi/SR_\mu$) and the result is stored in the ORT and OLT (see FIGS. 5, 19; 6, 20) and the OBT is actualised (FIGS. 7, 21).

f.) If it was a jump-command, in the $EFlags_\pi/SR_\mu$ it's analysed if it was an conditional jump.

1.3.5 Realisation of the Basic Needs:

1.3.5.1 Realisation of Artificial Pain:

Pain is caused by system-injuring. The basic pain in the biological evolution incidences already on monocellars and is the injuring of the DNA in the cell nucleus. If the DNA is damaged, the monocellar has to take time to repair its DNA using its resources. It does it by filling missing aminoacids in the defect half of the double helix by adding the complement aminoacids to the undamaged half.

The AC program is loaded twice into RAM. If the AC program (or another one) executes a command which overwrites a part of the active or inactive AC program, which means an injuring of the active or inactive code (DNA), it has the ability to recognise the damage by comparing the checksum, and has now to take time to repair the damaged code by comparing damaged and undamaged code to have information about the damage-location (valuable information for test-opcode analysis) and then copying the code from the undamaged version into the injured version to heal itself. If the active code was the injured one (had the corrupt checksum), it first has to jump into the inactive duplicate to prevent errors on self-healing, because the healing-routine itself could be damaged.

1.3.5.2 Realisation of Artificial Hunger:

Hunger means imminent loss of energy. Energy is engendered in the cells by transforming adenosintriphosphat to adenosindiphosphat. The energy for building up adenosintriphosphat from adenosindiphosphat is gained by combustion of glucose. Missing energy (ATP) makes metabolism and with it every action, reaction on pain, or self healing on injury, impossible.

The "energy quantity" of the AC-program is modelable by the height of a value in a data register. Now it would be possible to realise hunger by decreasing the electric current to the processor by external reading of this data register and increasing an ohm-resistance inverse proportional to the register value.

A less authentical hardware-unbound solution is possible too:

Less energy is harmful for learn-process. Frugal values in the energyspecific data-register cause lower functionality on learning from opcode-executions. On less values no learning from opcode-execution is possible. And lowest values cause loss of the saved knowledge from earlier opcode-executions. If the value is zero, additional pain, which means own code injury, occurs.

On hunger the AC-program consequently has to find and execute opcodes, which increase the value of the energyspecific data-register.

Decreasing energy, which means the origin of hunger, is simulated by decreasing the energyspecific data-register by 1 after every action (=opcode-execution) [p.e. by the AC-program itself].

1.3.6 Planning on the Criterions of the Valuation-System:

If the system tested all possible opcodes and analysed the effects of the suitable commands, it has now the possibility to learn planning aimed to comply its basic needs or its programming-aims: Therefore it combines the opcodes, executes them using all initial conditions and analyses, what effected the code-combination on every single initial condition.

Because mostly longer opcode-combinations are necessary to fulfill the programming-aim, it plans the code combination by using only codes which caused no injury (own damage) or better no RAM access at all and caused no fatal exceptions (divide-error or overflow-exception are allowed) and used no forbidden registers or opcodes (ADT.unused_Registers_BitCode|ADT.unused_Operations_BitCode). OpCodes which use the desired destination and source-registers are preferred (ADT. all_source/dest_Registers_BitCode).

ADT.aim_fulfill_valuation_mode appoints, if the valuation-function is existent in SQL or directly in machine-code. For the beginning user the slower SQL-version is more convenient and the specialist would prefer to use an assembler-aim_fulfilled_Flag Function (ADT) which is transformed into machine-code, because it's much faster on complex valuation-functions than SQL.

1.3.7 The Dynamic-Reflexive Valuation-System:

1.3.7.1 Valuation of the Programming-aim Closeness:

The ADT.aim_fullfilled_Flag_Function(Aim_ID), returns TRUE, if the programming-aim is obtained and the VFT.Valuation_Function(Type='A', ADT.aim_fullfilled_

Flag Function, VFT.Function_ID_Chain ), supplies a signed-byte value, which means the closeness of the actual CLT(n)-opcode-combination on the used initial conditions to the aim-solution. The result is stored into CLT(n).aim_valuation and builds up in comparison with the last CLT(n−1).aim_valuation the gradient CLT(n).gradient_aim_valuation.

Because of the solution program has to work for all initial conditions, the maximum- and the average valuability of the opcode-combination, both as average over all initial conditions, is stored in CBT(n).max_aim_valuation and CBT(n).avg aim_valuation; and the gradients to the corresponding values of the last CBT(n−1) build up CBT(n).max_grad_aim_valuation and CBT(n).avg_grad_aim_valuation.

If the boundary-value of −128 or +127 was the valuation-result, the VFT.boundary_value_counter is incremented, and analog low_value_counter is incremented, if a valuation-result between −16 and +15 occurred.

Using these statistical data, and on an analysis of all CLT(i).aim_valuation-values, p.e. if you count the number of values in a small value-range running from min-possible-result to max-possible-result (−127 to +128) in dependence of the width of the value-range-window, the SAC.Aim_Self_Valuation_Func appraises after every programming-aim attainment the valuation-results of the VFT.Valuation_Function and with it its efficiency.

If the most valuation-results of the VFT.Valuation_Function p.e. were near the boundary-values (min./max.), the valuation-function was too steep and has to be flattened, which means inside the VFT.Function_ID_Chain have to be more elements with negative FIT.Function_Flatten. The opposite is valid, if the most valuation-results caused a high VFT.low_value_counter.

So after every solution of a programming-aim a self-valuation of the valuation-function occurs and a further step in the self-programming of the valuation-function. New elements are added to the valuation-function and sometimes elements are omitted and the steepness is adapted.

Then the valuation is done again and it's revised if the new valuation-function would have supplied a better range of valuation-results.

If the new range of valuation-results was worse than the one before (valued by SAC.Aim_Self_Valuation_Function) then the modification of the valuation-function is quashed and another modification is tried. If the changing of the valuation-function ameliorated the range of valuation-results and the self-valuation-function returns a positive value, then it's continued with the next programming-task—otherwise a further amelioration of the valuation-function has to be done until self-valuation returns a positive value.

1.3.7.2 The Dynamic Energy-valuation-function:

The dynamic energyspecific valuation-system runs as follows:

0.) Because of the results of the energyspecific valuation-system are constricted to the range of signed_byte the valuation-function is embedded into a frame: valuation-result:=MIN[ MAX(valuation-function, −128), +127)]
1.) The energy-valuation-function of 0-th order is "how saturated am I after the action?": valuation-function(0):= MIN[ MAX(Energy after, −128), +127)]
2.) The valuation-function of 1st order is "how much more saturated am I after the action than before?":
  valuation-function(1):=MIN[ MAX(Energy_after—Energy_before, −128), +127]
3.) Because of the energy-register is of the type unsigned integer (DWord), the boundaries of the valuation would too often the result. Therefore a kind of logarithm or . . . valuation-function(2):=MIN[ MAX[ SORT(Energy_after—Energy_before ), −128], +127]
4.) Now negative energy-gradients would cause wrong signs, therefore 3rd square or valuation-function(3):= MIN[ MAX[ SGN(EnergyGrad)*SQRT(EnergyGrad), −128], +127],
  where EnergyGrad=Energy_after—Energy_before
  Possibly the function ½·SGN(EnergyGrad)·SQRT(SQRT (EnergyGrad)) would be better, because it reaches exactly to the boundary-values, but maybe the boundary-values are reached very seldom and a subtler structuring around zero would be more important.

This depends how often the boundaries are reached and how much energy-gradients supply small values. Maybe the naked result-value (Energy after) has to be weighted stronger and a valuation of the gradient alone is not sufficient. Moreover it had to be considered how much and which further registers are concerned beneath the energy-register and which and how much types of operations were executed, etc., and finally the execution-time of the energy-valuation-function itself. Therefore the energyspecific valuation-system has to be rarefied and adapted (like the valuation-system of intelligent biological life forms).

Using dynamic embedded [PL/]SQL the changing and reparsing of the as string stored valuation-function no problem. Because of the execution-speed and the possibility of implementation of earlier programming-aim solutions the energy-valuation-function should be used in machine-code prospectively.

The task of the amelioration of the energyspecific valuation-function is done, like the programming-aim specific one, after every fulfilling of a programming-aim.

Valuation-system and valuation-results are always reflexively.

1.3.8 Reaching Self-consciousness, Reproduction and Evolution:

Through the process of self-healing on pain/damage the program knows its location in memory. It now has the possibility to check out the effects of its own opcodes one after another, then consecutive opcode-combinations etc., and when it finally knows the effect of its total length, it'll reach self-consciousness and then has the possibility to reproduce itself and to ameliorate itself awarely while reproduction using its acquired knowledge (p.e. by removing the incommodious decrementing of the energy-register).

The intelligent conscious-varying reproduction is much more preeminenced than the biologic-genetic one, because the latter only refers to existing genes/DNA, while the AC-program can vary itself by changing and extending its code intentionally using its "experience of life".

1.4. Conceptual Formulation of the Programming-aim and Examples of Achievement To the AC-program an arbitrary programming-aim is challenged by giving one or more criterions in ADT.aim_fulfilled_Flag Function, by which it can check out, if it solved the task.

Its job is it now to develop a program, which solves the problem for all initial-conditions.

1.4.1 Example 1: Developing a Program to Compute the Average:

A very simple but easy to comprehend job for the AC-program could be: "write a program that computes the average over two integer-variables".

The AC-program fulfills this task, if the difference between the result and the lower number is equal to the difference of the higher number and the result, and this is functioning for any arbitrary input-numbers.

But the AC program doesn't know the instruction-set of the processor—it knows now only the opcodes which caused no damage and no fatal exception and it knows the opcode-effects in reference to the different initial-conditions.

Through corruption-selfhealing or the energy-register it already knows easiest abandonments like "execute an action which causes no pain" or "execute an action which makes me saturated".

For attaining economic programming-aims, it now needs valuation-variables, which reveals answers to the following questions:

a.) How much nearer or farther away from the programming-aim took me the last added opcode-combination (that every added single opcode of it may cause opposite effects is irrelevant).

b.) How many processor clock-cycles needed the solution-program.

c.) How many bytes long is my program and how many opcodes are included?

These answering variables (CBT-table-columns) are:

aim_valuation; cycles_of_execution; OpCode_length_or_jump.

The input-variables in the example-task could be in the first two data-registers (EAX$_\pi$, EBX$_\pi$, respectively D0$_\mu$, D1$_\mu$ respectively GPR0$_\psi$, GPR1$_\psi$), here R0 and R1.

The return-value should be the third data-register (ECX$_\pi$|D2$_\mu$|GPR2$_\psi$), here R2.

If the task is solved for arbitrary input-values, the program is ready, because it's function.

If there are more than one solution, the one is chosen which needs less clock-cycles.

The task-specific aim-fulfilled valuation-function, which computes OLT.aim_valuation is conse-quently in this example:

ADT.aim_fulfilled_Flag_Function(average of R0 and R1)={(R2–R0)=(R1–R2)}Here the problem could occur, that one input-value is even and the other one is odd, which means that this input-combination would have no solution. To implement that, the aim_fulfilled_Flag_Function should be enhanced for integer-variables: {(R2–R0 )=(R1–R2) ||(R2–R0 )+1= (R1–R2)}.

The AC-program will find several solution-programs and takes the one with the least needed clock-cycles.

A possible solution would be in CBT(3): MOV R0 , R2; ADD R1, R2; SHR R2 ( . . . naturally in machine-code of the used processor—using a Pentium that would be the 48-bit-number #$89C2.01CA.D1EA, using a Motorola that would be #$2400.D282.E2C2 and using a PowerPC (RISC) a 96-bit-number would be the solution).

1.4.2 Example_2: Generation of a Programs for Computation of the Cube-root:

A further easy development-task would be "write a program that returns the cube-root of a FFP (fast floating point) number"; the input-variable should be R0 (EAX$_\pi$) and the output-variable R3 (EBX$_\pi$).

The AC-program fulfills this task, if the result multiplied with its square is equal to the input-value (and this is valid for all initial conditions):

aim_fulfilled_Flag_Function(cube root)={(R3*R3*R3)=R0} (←naturally in FFP-multiplic.)

A single command like the square-root (FSQRT) doesn't exist for the cube root.

The solution-program could be in CBT(8) using a Pentium II as follows:

| | | | |
|---|---|---|---|
| Op1(16b): | MOV CL,3 | ;ECX = $????:0003 | [1011.0001:0000.0011] |
| Op2(16b): | FLD1 | ;ST(0) = 1.0 | [1101.1001:1110.1000] |
| Op3(16b): | FIDIV CX | ;ST(0) = ⅓ | [1101.1110:1111.0001] |
| Op4(16b): | FLD EAX | ;ST(0) = R0 ;ST(1) = ⅓ | [1101.1001:1100.0000] |
| Op5(16b): | FYL2X | ;ST(0) = ⅓ log$_2$(R0) | [1101.1001:1111.0001] |
| Op6(16b): | FLD1 | ;ST(0) = 1.0 ;ST(1) = ⅓ log$_2$(R0) | [1101.1001:1110.1000] |
| Op7(16b): | FSCALE | ;ST(0) = 1.0*2^[⅓ log$_2$(R0)] | [1101.1001:1111.1101] |
| Op8(16b): | FST EBX | ;EBX = 2^[⅓ log$_2$(R0)] | [1101.1001:1101.1011] |

( . . . naturally only the second of these columns as a 128-bit number with the bits set as shown in the last column.)

Hexadecimal that would be: B103.D9E8.DEF1.D9C0:D9F1.D9E8.D9FD.D9DB.

This would be a possible solution-number (=program) for the given task (there're surely shorter and faster solutions too).

1.5. Needed Hard-disk-space and Oblivion

In both examples 16-bit-opcodes would be sufficient, but it's obvious, that large programming-aims would need much hard-disk space. Therefore the AC-program has to forget unimportant or error-causing opcode-combinations.

1.5.1 Table Sizes:

IST, RIT and CIT need neglectable disk-space. Theoretically there could be size(0BT)=$2^{32}$*Σ bytes(column(i))=485 GB, but also on a RISC processor never all 32-bit-combinations are used as a valid opcode and realistic are as an average on RISC processors about 28 bits→30 GB and on CISC processors about 20 bits→118 MB [on latter the most are 16 bit-opcodes, there're a few 8-Bit- and several 24- and 32-bit-opcodes, and the ones which are longer 32-bits are not used (we don't need memory-to-memory-operations for example and the functionality of one long opcode can be substituted by two or more shorter opcodes).

The 62 initial conditions can cause size(OLT)=$2^{[20\cdots28]}$* 62*Σ bytes(column(i))=3 GB (CISC) up to 832 GB (RISC) and size(ORT) could reach the same quantity, considering that one opcode mostly pertains one destination- and one source-register (unitary ones use only the destination-register and a few seldom opcodes use 3 or more registers). But there could be many effect-belonging Operation_BitCodes, which would increase the tablespace dramatically, if it wouldn't be compensated by the many opcodes which cause an exception, where less information has to be stored.

A much larger problem is the exponential growth of the CxT(i), because every i multiplies the needed tablespace by factor of $2^{[20\cdots28]}$. But this is exact that what should be compensated by the dynamic valuation-system. It decreases its knowledge-absorption tolerance referable to the remaining hard-disk space: So opcode-combinations with least CBT(i).max_aim_valuation or .avg_aim_valuation are forgotten and so will not be combined with other opcodes.

Although if the demand of hard-disk space arrears large, this is no problem in near future. Also the according to the combination-possibilities and table-sizes increasing calculation-times are compensated by larger and faster becoming hard-disks and the increasing efficiency of the processors.

1.5.2 Oblivion:

Like all intelligent life-forms, the system has to forget unimportant and less important informations, because a.) the disk space is limited, and b.) data access time becomes slow on very large data-tables.

Therefore after every satisfactorily achievement of objectives, when a new programming-aim is given, the ELT and all CxT(i)-tables over a remaining disk-space dependent i are deleted, and the opcode-combinations in the remaining CxT(i) are revalued referable to the new programming-aim and forgotten opcode-combinations are added, if they're valuable for the new aim and the higher CxT(i) are recreated dynamically.

1.6. Becoming Conscious

Through try_and_error the program learned what effectuated every action and what are the effects of which sequence of actions.

Through corruption-healing (if own code was overwritten in RAM) it had to repair its code and so it knows its position in memory.

If it once knows the effect of its own machine-code, it gets self-consciousness and has the ability to reproduce its code and to ameliorate it while reproduction.

Through the so initialised evolution the AC becomes complexer and better and will be able to solve larger and larger programming-tasks in future.

1.7. Presentment of the Economic Advantages

Here a totally new area of using a computer is presented. While normally in a computer run by man generated programs, which execute user-controlled applications, the AC-program itself develops and executes programming-aim oriented routines, which can later embedded into a large application.

The demand for software-development is worldwide much larger than the human potential of developers.

A system which learns to write programs itself has the capability to solve smaller development-tasks, and will in future, after several evolution-steps, have the capability to develop complex programs as the solution of large tasks too, if it has got enough hard-disk space.

The programmers will not have to develop all the routines they need—they order the routine from the AC-program and embed it into their application. So the companies can finish and sell their software-products earlier.

What is claimed is:

1. A method using a computer which automatically generates and executes machine-code, comprising the steps of
   a) preventing the multi-tasking of the operation-system, by setting the interrupt-mask of the processor to NMI or using a multitasking-disable-routine of the operating-system;
   b) capturing the processors exception-vectors by own analysis-routines;
   c) generating normal numbers and writing them into memory;
   d) backing up the current values of the processors registers;
   e) positioning the instruction-pointer=program-counter to the generated number in memory and executing the number like it would be a processor-opcode; and
   f) analysing the effects of this opcode-like execution of the number and storing the analysis-results, p.e. in a database.

2. A method according to claim 1, wherein said step of (d) "backing up the current values of the processors registers" comprising the steps of:
   a) not only saving them for a later comparison but setting them to predefined initial conditions;
   b) setting them not only one time but several times to many different predefined initial conditions which means several executions of one number in step (e) by these different initial conditions for to have a more efficient analysis-deterrninatibns of possible number-execution-effects in step (f).

3. A method according to claim 2, wherein said step (1*f*) "analysing the effects of this opcode-like execution of the number" further comprising the step of determining the number=opcode's mnemonic and its related source- and destination-registers by regarding all execution-effects of every initial condition.

4. A method according to claim 3, wherein said step (1*c*) "generating normal numbers and writing them into memory" comprising the steps of combinations, which means:
   a) taking one number which analysed results are already stored and appending another number with stored analysis-results to analyze the execution-effects of this two-number-combination and store the result;
   b) combining 2-number-combinations, which effects are already analysed, with a further analysed number and analysing and storing the analysis-results of the effects of these 3-number-combinations;
   c) combining a 3-number-combination, which effects are already analysed, with a further number, which effects are already analysed, or combining two 2-number-combinations, which effects are already analysed, and analysing and storing the effects of these 4-number-combinations;
   d) combining larger combinations, which effects are already analysed, with numbers or combinations, which effects are already analysed, and analysing and storing the effects of these larger combinations.

5. A method according to claim 4, further comprising the step of using only combinations for further use, which got a positive value from a valuation-function, which appraises the valuability of the combination in reference to reaching a pregiven programming-aim, not causing fatal exceptions, not overwriting exception-vectors or the program, avoiding to use forbidden registers or extensive writes to memory or large jumps, etc.

6. A method according to claim 5, further comprising the step of valuating and changing the valuation-function of the dynamic valuation-system by a meta-valuation-function valuating the results of the valuation-function according to clustering to boundary-values, low-values, other fixed values, etc., and then revaluating the results of the new valuation-function.

7. A method according to claim 4, further comprising the step of implementing calls to operation-system routines which are offered in a table with entrance-address and source- and destination-registers.

8. A method according to claim 7, further comprising the step of using only calls and combinations for further use, which got a positive value from a valuation-function, which appraises the valuability of the call-combination in reference to reaching a pregiven programming-aim, not causing fatal exceptions, not overwriting exception-vectors or the program, avoiding to use forbidden registers or extensive writes to memory or large jumps, etc.

9. A method according to claim 8, further comprising the step of offering the disassembly of the solution-programs which solved the programming-aim.

10. A method using a computer which automatically generates and executes machine-code, comprising the steps of
   a) capturing the tasks=processes exception-vectors by own analysis-routines;
   b) generating normal numbers and writing them into memory;
   c) backing up the current values of the processors registers;
   d) positioning the instruction-pointer=program-counter to the generated number in memory and executing the number like it would be a processor-opcode; and
   e) analysing the effects of this opcode-like execution of the number and storing the analysis-results, p.e. in a database.

11. A method according to claim 10, further comprising the steps of modelling the following basic needs:
   a) "no_pain", where pain means damage to the own program, which is an overwriting of the own machine-code, which is recognised by comparing the programs checksum after every execution of a number or number-combination, and repairing damaged parts of the own machine-code from a duplication, which causes a decrementation of the energy-register for every damaged opcode of the own program which now has to be copied for reparation; and
   b) "no_hunger", where hunger means the imminent loss of energy, where energy is modelled by the value of a predefined register, which causes negative effects on low values like
      the loss of the capability of appraising combinations referable to the programming aim on low values of the energy-register,
      mistakes on the valuation of the combination-execution concerning the source-registers on very low values of the energy-register,
      the loss of the capability of self-repairing on "pain" on extreme low values of the energy-register,
      a hardware-dependant decreasing of the power supply of the RAM (p.e. by increasing a resistor) on two times in series extreme low values of the energy-register,
      a hardware-dependant decreasing of the power supply of the processor (p.e. by increasing a resistor) on three times in series extreme low values of the energy-register, and this energy-register is decremented after every action, where action means the execution of a number.

12. A method according to claim 10, wherein said step of (10c) "backing up the current values of the processors registers" further comprising the steps of
   a) not only saving them for a later comparison but setting them to predefined initial conditions;
   b) setting them not only one time but several times to many different predefined initial conditions which means several executions of one number in step (10d) by these different initial conditions for to have a more efficient analysis-determinations of possible number-execution-effects in step (10e).

13. A method according to claim 12, wherein said step (10e) "analysing the effects of this opcode-like execution of the number" further comprising the step of determining the number=opcode's mnemonic and its related source- and destination-registers by regarding all execution-effects of every initial condition.

14. A method according to claim 13, further comprising the step of valuating the effects of the execution of the number in reference to its basic needs, which means positive values for numbers, which cause no pain or increase the energy-register and negative values for numbers which cause above defined "pain" or "hunger".

15. A method according to claim 14, further comprising the step of combining numbers and executing these combinations and valuating the effects of the executions of these combinations.

16. A method according to claim 15, comprising the step of running several of these said programs as an extra process=task.

17. A method according to claim 15, comprising the step of using a network topology where on two or more of the networked computers is running one of these programs.

18. A method according to claim 15, further comprising the step of implementing calls to operation-system routines which are offered in a table with entrance-address and source- and destination-registers.

19. A method according to claim 18, further comprising the step of using only calls and combinations for further use, which got a positive value from a valuation-function, which appraises the valuability of the call-combination in reference to reaching a pregiven programming-aim, not causing fatal exceptions, not overwriting exception-vectors or the program, avoiding to use forbidden registers or extensive writes to memory or large jumps, etc.

20. A method according to claim 14, further comprising the step of analysing a pregiven code by executing larger getting sequences of it instead of executing number-combinations, for to evaluate the effects these code-sequences or at least of the complete program.

21. A method according to claim 20, further comprising the step of improving the analysed code in the direction of a pregiven programming-aim.

* * * * *